US012092060B2

(12) United States Patent
Benson et al.

(10) Patent No.: US 12,092,060 B2
(45) Date of Patent: *Sep. 17, 2024

(54) FUEL INJECTOR WITH FLEXIBLE MEMBER

(71) Applicant: Cummins Inc., Columbus, IN (US)

(72) Inventors: Donald J. Benson, Columbus, IN (US); Ahmad M. Sabri, Columbus, IN (US)

(73) Assignee: Cummins Inc., Columbus, IN (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/578,171

(22) Filed: Jan. 18, 2022

(65) Prior Publication Data

US 2023/0167793 A1 Jun. 1, 2023

Related U.S. Application Data

(63) Continuation of application No. 16/756,663, filed as application No. PCT/US2017/057571 on Oct. 20, 2017, now Pat. No. 11,255,306.

(51) Int. Cl.

*F02M 55/00* (2006.01)
*B05B 1/30* (2006.01)
(Continued)

(52) U.S. Cl.

CPC ......... *F02M 55/002* (2013.01); *B05B 1/3053* (2013.01); *F02M 51/0603* (2013.01);
(Continued)

(58) Field of Classification Search

CPC .. F02M 55/002; F02M 51/0603; F02M 61/04; F02M 61/1806; F02M 61/1886;
(Continued)

(56) References Cited

U.S. PATENT DOCUMENTS 4,852,808 A 8/1989 Yamamoto
6,471,142 B1 10/2002 Lambert
(Continued)

FOREIGN PATENT DOCUMENTS

CN 104481767 A 4/2015
EP 2647826 B1 3/2016
(Continued)

OTHER PUBLICATIONS

International Search Report and Written Opinion issued by the ISA/US, Commissioner for Patents, for International Application No. PCT/US2017/057571, dated Feb. 5, 2018, 9 pages.
(Continued)

*Primary Examiner* — Steven M Cernoch
(74) *Attorney, Agent, or Firm* — Taft, Stettinius & Hollister LLP

(57) ABSTRACT

A fuel injector includes an injector body comprising an internal injector cavity, a flow passageway, and a drain conduit. The flow passageway is in fluid communication with at least one injector orifice. The fuel injector further includes a valve assembly comprising a valve seat and a valve member in fluid communication with the fuel circuit. The valve member is configured to move between an open position allowing fuel flow through the at least one injector orifice and a closed position inhibiting fuel flow through the at least one injector orifice. The fuel injector also includes a nozzle valve element fluidly coupled to the valve assembly, an actuator operably coupled to the valve assembly and the nozzle valve element, and a flexible member configured to elastically deform in response to pressure in the fuel injector. The flexible member is configured to inhibit flow to the drain circuit during an injection event.

30 Claims, 13 Drawing Sheets

(51) Int. Cl.
*F02M 51/06* (2006.01)
*F02M 61/04* (2006.01)
*F02M 61/18* (2006.01)

(52) U.S. Cl.
CPC ........ *F02M 61/04* (2013.01); *F02M 61/1806* (2013.01); *F02M 61/1886* (2013.01); *F02M 2200/21* (2013.01); *F02M 2200/26* (2013.01); *F02M 2200/9053* (2013.01)

(58) Field of Classification Search
CPC ........... F02M 2200/21; F02M 2200/26; F02M 2200/9053; B05B 1/3053
See application file for complete search history.

(56) References Cited

U.S. PATENT DOCUMENTS

| | | | |
|---|---|---|---|
| 6,739,528 B2 | 5/2004 | Lorraine | |
| 6,913,206 B2 | 7/2005 | Cobianchi | |
| 7,963,155 B2 | 6/2011 | Kondo | |
| 11,255,306 B2 * | 2/2022 | Benson | F02M 61/1806 |
| 2002/0008159 A1 | 1/2002 | Kalsura | |
| 2016/0177900 A1 | 6/2016 | Benson | |
| 2020/0258905 A1 | 8/2020 | Lee | |

FOREIGN PATENT DOCUMENTS

| | | |
|---|---|---|
| WO | 2005019637 A1 | 3/2005 |
| WO | 2009056400 A1 | 5/2009 |
| WO | 2014164436 A1 | 10/2014 |

OTHER PUBLICATIONS

International Preliminary Report on Patentability issued by the International Bureau of WIPO, dated Apr. 21, 2020, for International Patent Application No. PCT/US2017/057571, 8 pages.

Office Action issued by the German Patent and Trademark Office (in German language), dated May 5, 2021 for German Application No. 112017007931.4; 9 pages.

* cited by examiner

FUEL INJECTOR WITH FLEXIBLE MEMBER

The present application a continuation of U.S. patent application Ser. No. 16/756,663, titled "FUEL INJECTOR WITH FLEXIBLE MEMBER," filed on Apr. 16, 2020, which is a national stage application of International (PCT) Patent Application Serial No. PCT/US2017/057571, filed on Oct. 20, 2017, the complete disclosures of which are expressly incorporated by reference herein.

FIELD OF THE INVENTION

The present invention relates generally to controlling fuel flow through a fuel injector and, more particularly, to inhibiting drain fuel flow during an injection event.

BACKGROUND OF THE DISCLOSURE

During injection events, fuel may flow from an injector cavity within the fuel injector to the drain conduit through a pilot valve, thereby leading to parasitic fuel flow or leakage and causing inefficiencies of the fuel injector. Additionally, such parasitic fuel flow may cause damage to the control or pilot valve seat, as well as other inefficiencies that can lead to an inaccurate injected fueling quantity, noise, failures, and other concerns.

It may be possible to reduce the drain fuel flow during an injection event by using a movable or translating member configured to move between open and closed positions to inhibit or allow fuel flow to the drain circuit. However, the mobility of such a member or component requires additional components and increases the complexity of the system, as the movement must be calibrated and controlled within narrow tolerances. Additionally, by utilizing a translating member, additional possible failure mechanisms may be introduced if the component fails to move as required.

Therefore, there is a need for a component, assembly, system, and/or method configured to minimize parasitic fuel flow to the drain circuit through the pilot valve during an injection event without the use of a movable/translating component. Such a component, system, and/or method would reduce parasitic leakage during injection events and improve fuel injector efficiency.

SUMMARY OF THE DISCLOSURE

The present disclosure is configured to reduce the quantity of fuel flow from the injector cavity to the drain conduit during an injection event. More particularly, the present disclosure is configured to limit the magnitude of drain flow quantity flowing from the injector cavity, through the pilot valve, and into the drain conduit during an injection event.

In one embodiment, a fuel injector comprises an injector body comprising an internal injector cavity, a flow passageway, and a drain conduit. The flow passageway is in fluid communication with at least one injector orifice. The fuel injector further comprises a valve assembly comprising a valve seat and a valve member in fluid communication with the fuel circuit. The valve member is configured to move between an open position allowing fuel flow through at least one injector orifice and a closed position inhibiting fuel flow through the at least one injector orifice. The fuel injector also comprises a nozzle valve element fluidly coupled to the valve assembly, an actuator operably coupled to the valve assembly and the nozzle valve element, and a flexible member configured to elastically deform in response to pressure in the fuel injector. The flexible member is configured to inhibit flow to the drain circuit during an injection event.

In another embodiment, a fuel injector comprises a fuel circuit including a flow passageway and a drain conduit, and the flow passageway is in fluid communication with at least one injector orifice. The fuel injector also comprises a valve assembly in fluid communication with the fuel circuit which includes a control valve seat and a control valve member configured to be received within the control valve seat. The control valve member is configured to move between an open position allowing fuel flow through at least one injector orifice and a closed position inhibiting fuel flow through the at least one injector orifice. Additionally, the fuel injector comprises a nozzle valve element having at least a portion defining a plunger and the nozzle valve element is fluidly coupled to the valve member. The fuel injector also comprises an actuator operably coupled to the valve member and the nozzle valve element. Also, the fuel injector comprises a flexible member positioned at a fixed location which is configured to elastically deform to inhibit flow to the drain circuit during an injection event.

In a further embodiment, a method of controlling fuel flow through a fuel injector during an injection event comprises providing a fuel circuit having a flow passageway and a drain conduit, moving a control valve member from a control valve seat to define an open position to allow fuel flow through the flow passageway, moving a nozzle valve element to allow fuel flow through the fuel injector, elastically deforming a flexible member in a first direction during fuel flow through the flow passageway and from the fuel injector, and inhibiting fuel flow to the drain circuit when elastically deforming the flexible member in the first direction.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
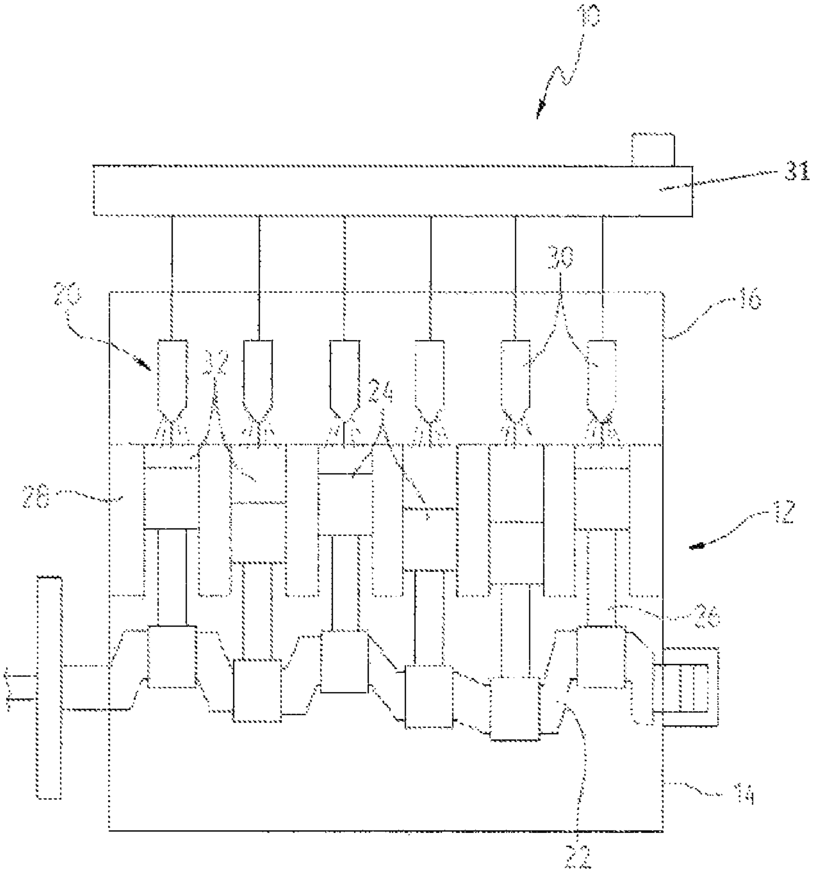
FIG. 1 is a schematic view of an engine.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Referring to FIG. 1, a portion of an internal combustion engine 10 is shown as a simplified schematic. Engine 10 includes an engine body 12, which supports an engine block 14, a cylinder head 16 coupled to engine block 14, and a fuel system 20. Engine body 12 further includes a crankshaft 22, a plurality of pistons 24, and a plurality of connecting rods 26. Pistons 24 are configured for reciprocal movement within a plurality of engine cylinders 28, with one piston 24 positioned in each engine cylinder 28. Each piston 24 is operably coupled to crankshaft 22 through one of connecting rods 26. A plurality of combustion chambers 32 are each defined by one piston 24, cylinder head 16, and cylinder 28. The movement of pistons 24 under the action of a combustion process in engine 10 causes connecting rods 26 to move crankshaft 22. In one embodiment, engine 10 may be characterized as a large-bore, high-speed engine. For example, engine 10 may be a two-stroke engine, a four-stroke engine, a diesel engine, an internal combustion engine, or any other type of engine.

Referring still to FIG. 1, when engine 10 is operating, a combustion process occurs in combustion chambers 32 to cause movement of pistons 24. The movement of pistons 24 causes movement of connecting rods 26, which are drivingly connected to crankshaft 22, and movement of connecting rods 26 causes rotary movement of crankshaft 22. The angle of rotation of crankshaft 22 may be measured by a crank sensor of a control system (not shown) for engine 10 to aid in timing the combustion events in engine 10 and for other purposes.

Crankshaft 22 drives at least one fuel pump to pull fuel from the fuel tank in order to move fuel toward fuel injectors 30. The control system provides control signals to fuel injectors 30 that control operation thereof based on operating parameters for each fuel injector 30, such as the length of time fuel injectors 30 operate and the number of fueling pulses per a firing or injection cycle period, thereby determining the amount of fuel delivered by each fuel injector 30.

As shown in FIG. 1, fuel system 20 includes a plurality of fuel injectors 30 positioned within cylinder head 16 and fluidly coupled to a fuel rail 31. Each fuel injector 30 is fluidly coupled to one combustion chamber 32. In operation, fuel system 20 provides fuel to fuel injectors 30, which is then injected into combustion chambers 32 by the action of fuel injectors 30, thereby forming one or more injection events or cycles. As detailed further herein, the injection cycle may be defined as the interval that begins with the movement of a nozzle or needle valve element to permit fuel to flow from fuel injector 30 into an associated combustion chamber 32, and ends when the nozzle valve element moves to a position to block the flow of fuel from fuel injector 30 into combustion chamber 32. More particularly, the nozzle valve element of each fuel injector 30 may move from the closed position to the open position when fuel injector 30 is energized by the control system to inject fuel into combustion chamber 32 during an injection event. The nozzle valve element remains open for a period, called the fuel on-time ("FON") and which corresponds to the injection event to provide a predetermined volume, amount, or quantity of fuel to combustion chamber 32, as determined by the control system based on engine operation state and inputs to engine 10, such as acceleration, torque or power, engine speed, and fuel pressure. At the end of the predetermined period, the control system de-energizes fuel injector 30, which causes the nozzle valve element to close, ending the injection event. While the nozzle valve element is described as opening when energized and closing when de-energized, fuel injector 30 may also operate in an opposite manner where the nozzle valve element opens when de-energized and closes when energized.

The control system provides control signals to fuel injectors 30 that determine operating parameters for each fuel injector 30 which, together with the rail pressure, are used to calculate the amount of fuel delivered by each fuel injector 30. For example, the operating parameters may include the duration of the injection event or FON, the pressure within fuel rail 31, and/or the start-of-injection ("SOI") and may include other operating parameters for each fuel injector 30.

In addition to fuel system 20, the control system controls, regulates, and/or operates other components of engine 10 that may be controlled, regulated, and/or operated. More particularly, the control system may receive signals from sensors located on engine 10 and transmit/receive control signals or other inputs to devices located on engine 10 in order to control or receive data from such devices. The control system may include a controller or engine control module ("ECM") and a wire harness. The ECM may be a processor having a memory, a transmitter, and a receiver. For example, actions of the control system may be performed by elements of a computer system or other hardware capable of executing programmed instructions, for example, a general purpose computer, special purpose computer, a workstation, or other programmable data processing apparatus. These various control actions also may be performed by specialized circuits (e.g., discrete logic gates interconnected to perform a specialized function), by program instructions (software), such as logical blocks, program modules, or other similar applications which may be executed by one or more processors (e.g., one or more microprocessors, a central processing unit (CPU), and/or an application specific integrated circuit), or any combination thereof. For example, embodiments may be implemented in hardware, software, firmware, middleware, microcode, or any combination thereof. Instructions may be in the form of program code or code segments that perform necessary tasks and can be stored in a non-transitory, machine-readable medium such as a storage medium or other storage(s). A code segment may represent a procedure, function, subprogram, program, routine, subroutine, module, software package, class, or any combination of instructions, data structures, or program statements. A code segment may be coupled to another code segment or a hardware circuit by passing and/or receiving information, data, arguments, parameters, or memory contents. In this way, the control system is configured to control operation of engine 10, including fuel system 20.

Figure 2A:
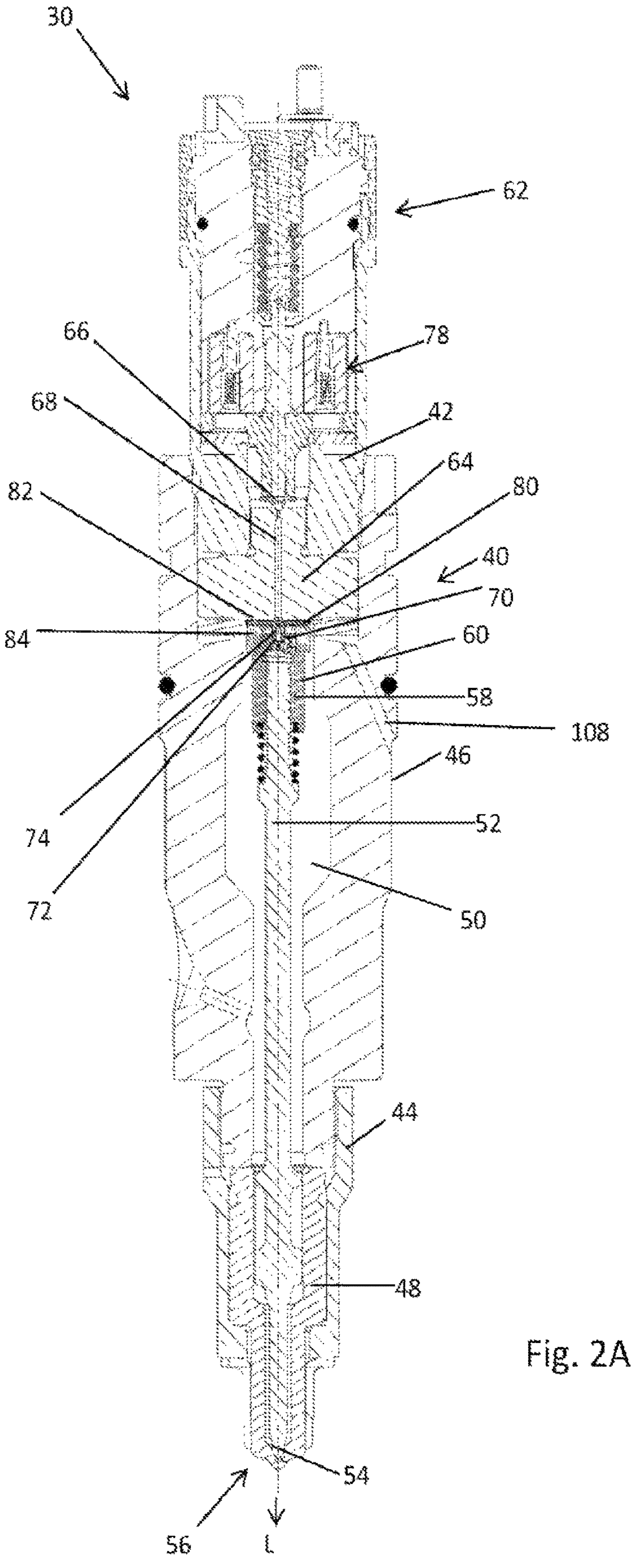
FIG. 2A is a cross-sectional view of a fuel injector of the engine of FIG. 1.

Referring to FIG. 2A, fuel injector 30 is defined by an injector body 40 which extends along a longitudinal axis L. Injector body 40 includes an upper body 42, a lower body 44, and an outer housing 46 coupling upper body 42 to lower body 44. Lower body 44 includes a nozzle housing 48 which generally surrounds an injector cavity 50. A nozzle or needle valve element 52, which extends generally along longitudinal axis L, is received within injector cavity 50 and is fluidly coupled to injector orifices 54 at a distal end 56 of lower body 44. Nozzle valve element 52 also extends into a clearance 58 formed within a nozzle element guide or sleeve 60. During operation of fuel injector 30, nozzle valve element 52 is movable between an open position in which fuel may flow through injector orifices 54 into combustion chamber 32 (FIG. 1) and a closed positon in which fuel flow through injector orifices 54 is blocked.

Referring still to FIG. 2A, upper body 42 includes an injector control valve assembly 62. Injector control valve assembly 62 includes a pilot valve defined by a control valve seat 64 and a control valve member 66. Illustratively, control valve member 66 is configured to reciprocate along longitudinal axis L during operation of fuel injector 30 to allow and prevent fuel flow at injector orifices 54. Control valve member 66 is fluidly coupled to a control chamber or volume 70 through a flow passage 68 extending longitudinally through control valve seat 64.

As shown in FIG. 2A, positioned within control chamber 70 is an upper plunger member 72 also configured to reciprocate along longitudinal axis L during operation of fuel injector 30. Upper plunger member 72 is coupled to a force biasing element (e.g., spring 74) which is in contact with sleeve 60 defined by the proximal end of nozzle valve element 52.

Referring still to FIG. 2A, movement of control valve member 66, upper plunger member 72, and nozzle valve element 52 may be controlled by an actuator assembly 78 of injector control valve assembly 62. Actuator assembly 78 may include one or more solenoids, piezoelectric devices, or any other type of actuating device configured to allow movement of various components of fuel injector 30.

During operation of fuel injector 30, fuel from fuel rail 31 (FIG. 1) is supplied to fuel injector 30. However, during periods of injection, fuel may flow from injector cavity 50 into a drain conduit 108 through the pilot valve, for example through control valve seat 64, thereby leading to parasitic drain flow during an injection event. This parasitic drain flow can contribute to a loss of efficiency in fuel system 20 and/or engine 10 and decreased fuel economy. Therefore, as disclosed herein, fuel injector 30 is configured to prevent or inhibit this parasitic drain flow of fuel while still allowing the necessary flow of fuel between fuel injector 30 and fuel rail 31 during periods of injection and non-injection. By inhibiting parasitic drain flow, the efficiency of fuel system 20 may increase, the fuel economy may increase, the fuel injector failure mechanisms may decrease, and fueling sensitivity to small changes in pilot valve stroke may improve.

To decrease the quantity of parasitic drain fuel flow, fuel injector 30 includes an elastically-flexible or deformable member 80 positioned within a portion of injector body 40, as disclosed further herein and shown in FIGS. 2A-2D. Elastically-flexible member 80 is configured to elastically, rather than plastically, deform within the elastic yield tensile range of the material comprising member 80, as disclosed further herein. More particularly, elastically-flexible member 80 is configured to elastically bend, flex, or otherwise deform in response to pressure within fuel injector 30 within its elastic yield tensile range such that elastically-flexible member 80 does not experience permanent or plastic deformation but, instead, is configured to return to a neutral position (or non-flexed) position depending on the pressure within fuel injector 30.

Figure 2B:
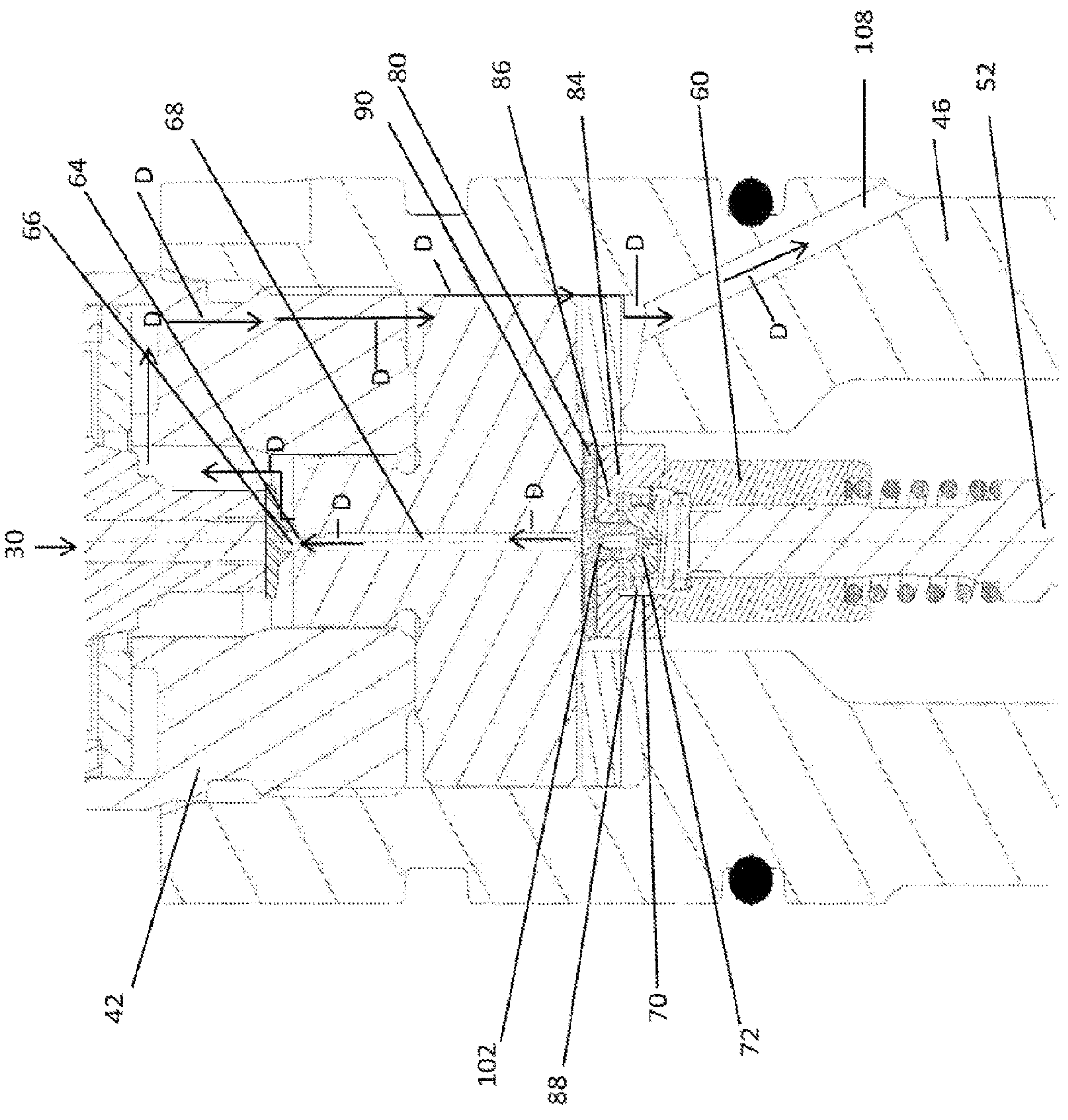
FIG. 2B is a detailed cross-sectional view of a flexible member of the fuel injector of FIG. 2A.
Figure 2C:
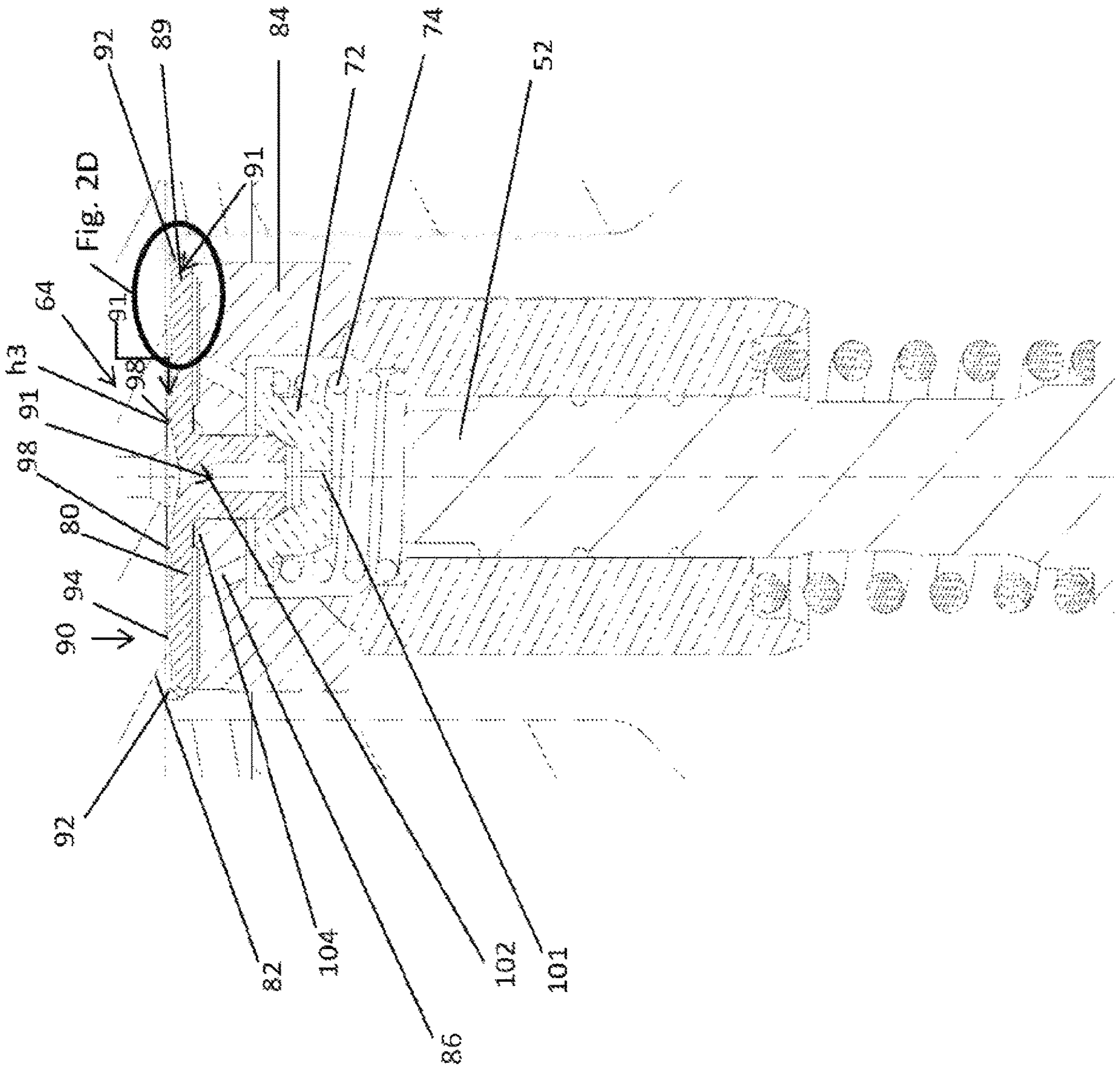
FIG. 2C is a further detailed cross-sectional view of the flexible member of FIG. 2B.

Illustratively, as shown best in FIGS. 2A-2C, elastically-flexible member 80 is positioned within outer housing 46 at a position longitudinally above upper plunger member 72. Elastically-flexible member 80 may be adjacent to or in contact with a lower end 82 of control valve seat 64 and also is in contact with a retainer 84. The interface between the outer diameter of retainer 84 and elastically-flexible member 80 is determined based on the pressure within injector cavity 50. More particularly, because the pressure in injector cavity 50 generally represents the highest pressure within fuel injector 30, the amount of surface area of elastically-flexible member 80 which is exposed to the pressure of injector cavity 50 affects the elastic deflection or deformation of the elastically-flexible member 80. As such, FIG. 2D illustratively discloses that the outer diameter of retainer 84 generally extends along a majority of the lateral width of elastically-flexible member 80 such that the amount of surface area of elastically-flexible member 80 exposed to the pressure of injector cavity 50 is calibrated relative to the lateral width of retainer 84.

Illustratively, retainer 84 is configured to contact sleeve 60 and support a lower portion of elastically-flexible member 80 within injector body 40. Additionally, retainer 84 is configured to remain in a stationary or fixed position within outer housing 46, as disclosed further herein. However, while retainer 84 is not configured to translate or move to different locations within fuel injector 30, retainer 84 is configured for slight movement or deformation in response to the deformation of elastically-flexible member 80.

Figure 2D:
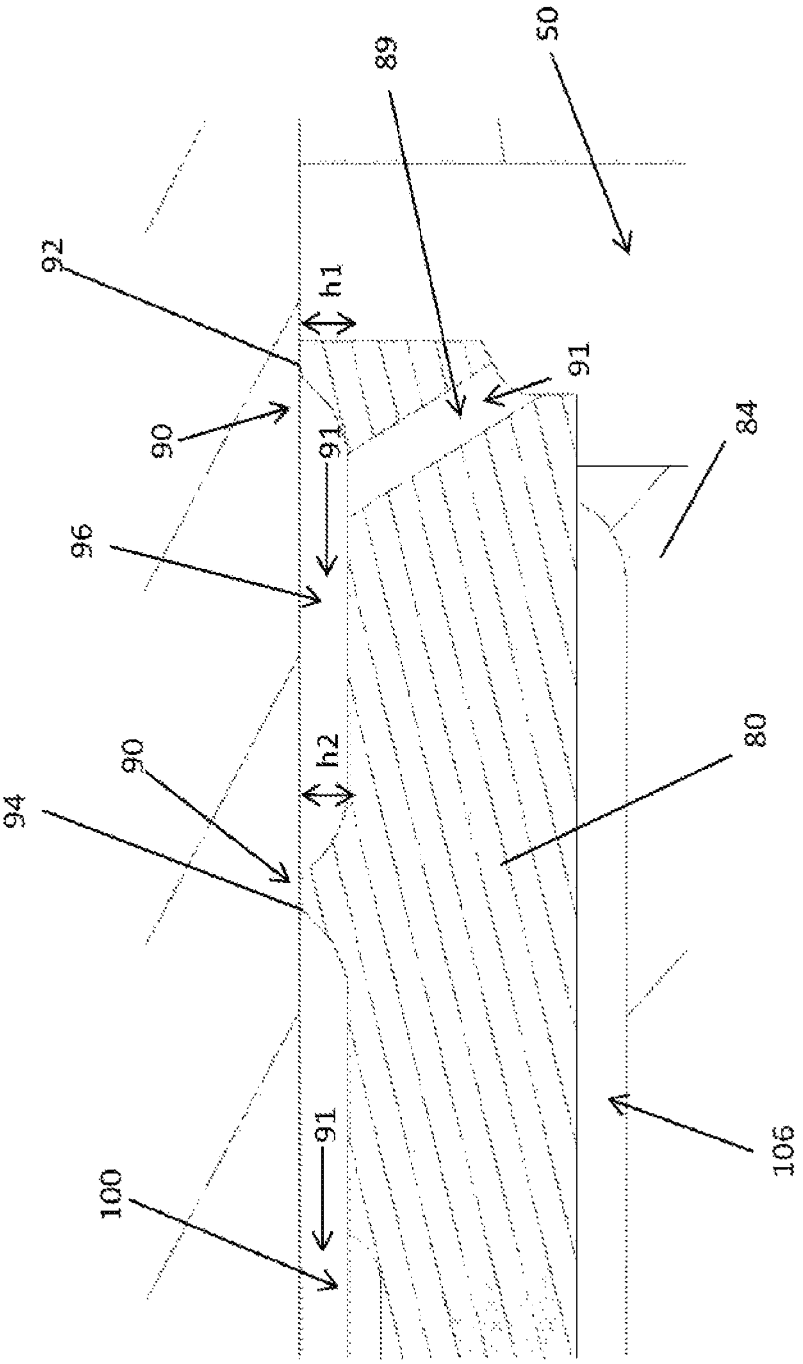
FIG. 2D is a cross-sectional view of a portion of the flexible member of FIG. 2C.

Referring to FIGS. 2B-2D, retainer 84 may include at least one fluid passage 86 in fluid communication with control volume 70. Illustratively, fluid passage 86 may be angled relative to longitudinal axis L, although any configuration of fluid passage 86 may be used. Retainer 84 also includes a recess 88 which generally surrounds control volume 70 and is configured to receive at least a portion of upper plunger member 72 and spring 74.

Referring still to FIGS. 2B-2D, elastically-flexible member 80 includes a plurality of annular projections 90 in a radially-concentric arrangement such that each of the plurality of projections 90 is concentric about longitudinal axis L. Illustratively, the plurality of projections 90 includes a first or radially-outer projection 92 positioned at or near the circumference or periphery of elastically-flexible member 80. In one embodiment, first projection 92 defines the outer diameter or circumference of elastically-flexible member 80. Additionally, the plurality of projections 90 includes a second or radially-inner projection 94. First and second projections 92, 94 are spaced apart by a recess 96. The plurality of projections 90 also may include a third projection 98 positioned radially inward of second projection 94. Second and third projections 94, 98 are spaced apart from each other by a recess 100. Overall, the outer diameter of elastically-flexible member 80 is significantly larger than its thickness and this outer diameter relative to the thickness allows for the elastic deformation of elastically-flexible member 80.

In one embodiment, and referring still to FIGS. 2B-2D, the height of projections 92, 94, 98 may be different. For example, first projection 92 may have a first longitudinal height ($h_1$) defining the greatest longitudinal height relative to second and third projections 94, 98. Additionally, second projection 94 may have a second longitudinal height ($h_2$) less than that of first projection 92 but greater than a third longitudinal height ($h_3$) of third projection 98. In one embodiment, heights ($h_1$, $h_2$, $h_3$) of projections 92, 94, 98 decrease in a radially-inward direction toward longitudinal axis L and may be positioned along a diagonal line angled at approximately 0.1-1.0 degrees, and more particularly 0.6 degrees, from horizontal. Alternatively, heights ($h_1$, $h_2$, $h_3$) of projections 92, 94, 98 can be in any configuration and at any height.

The declining heights of projections 90 in the radially inward direction provides for increasingly larger axial gaps or distances in the direction of longitudinal axis L between the uppermost extent of each projection 90 and lower end 82 of control valve seat 64. More particularly, first projection 92 always remains in contact with lower end 82 of control valve seat 64 such that the outer diameter or perimeter of elastically-flexible member 80 is always seated and intended to be sealed against control valve seat 64. However, the uppermost extent of second projection 94 is spaced apart from lower end 82 by an axial gap or distance when elastically-flexible member 80 is in a neutral (i.e., non-flexed) position. Similarly, an axial gap or distance between the uppermost extent of third projection 98 and lower end 82 exists when elastically-flexible member 80 is in the neutral position and may be greater than that of second projection 94. In one embodiment, third projection 98 defines an upper deflection limit for elastically-flexible member 80 such that further upward deflection thereof is prevented when third projection 98 contacts lower end 82 of control valve seat 64.

In this way, and as disclosed further herein, when elastically-flexible member 80 flexes in an upward direction, second and/or third projections 94, 98 are configured to contact lower end 82 of control valve seat 64. Second projection 94 is configured to seal elastically-flexible member 80 thereto. Because third projection 98 is intended to function as a stop but not as a seal, the configuration of elastically-flexible member 80 includes flow passages which radially span third projection 98. As such, when elastically-flexible member 80 elastically deforms in an upward direction, fuel at elastically-flexible member 80 may be prevented from flowing towards drain conduit 108. Yet when elastically-flexible member 80 is in a neutral position or elastically deforms in a downward direction, second and third projections 94, 98 are spaced apart from control valve seat 64 such that fuel may flow through a portion of elastically-flexible member 80.

In operation, and as disclosed in FIGS. 2B-2D, when a fuel injection event is initiated, injector control valve assembly 62 is energized or otherwise actuated, thereby energizing actuator assembly 78. This actuation of injector control valve assembly 62 causes control valve member 66 to start to move to an open condition by lifting off of control valve seat 64. As control valve member 66 begins to move upwardly in the direction of longitudinal axis L, pressures within fuel injector 30 around elastically-flexible member 80 begin to change. More particularly, pressure at the upper surface of elastically-flexible member 80 decreases because fluid from flow passage 68 and control volume 70 moves upwardly through control valve member 66. For example, as shown in FIG. 2B, the fluid from control volume 70 flows through orifices 101, 102 and in the direction of arrows D through flow passage 68 and through slots (not shown) for drain fuel flow. Referring still to FIG. 2B, fuel flows in direction D from flow passage 68 upwardly and laterally outwardly before flowing downwardly and into drain conduit 108. It may be appreciated that the effective flow areas of first central orifice 101 and/or second central orifice 102 may control the rate of fuel flow therethrough such that the size of first and/or second central orifices 101, 102 has some effect on the opening rate of injector control valve assembly 62.

This flow of fuel from control volume 70, through orifices 101, 102, and through flow passage 68 decreases the pressure at the upper surface of elastically-flexible member 80 and creates a pressure differential between the pressures which act on the upper surfaces of elastically-flexible member 80 relative to the pressures which act on the lower surfaces of elastically-flexible member 80. Additionally, fuel flow from injector cavity 50 through inlet orifice 89 of elastically-flexible member 80 creates a pressure differential drop between the pressure in injector cavity 50 and the pressure downstream of inlet orifice 89. As such, if elastically-flexible member 80 were to remain in a neutral position during an injection event, fuel from injector cavity 50 would flow into inlet orifice 89, past the open gap between second projection 94 and the lower end 82 of control valve seat 64, through flow passage 68, past control valve member 66 toward drain conduit 108, through the axial gap between the uppermost extents of second and third projections 94 and 98, into flow passage 68, and in direction D to drain conduit 108. In this way, parasitic fuel flow to drain conduit 108 would occur due to this flow between injector cavity 50 and drain conduit 108.

However, to inhibit this parasitic drain flow from injector cavity 50 to drain conduit 108 during an injection event, while still allowing the necessary flow from control volume 70 through flow passage 68, the present disclosure provides elastically-flexible member 80. More particularly, the pressure differential on elastically-flexible member 80 caused by the decreased pressure at the upper surface thereof and the relatively higher pressure at the lower surface thereof in response to the fuel flow towards drain conduit 108 causes elastically-flexible member 80 to elastically bend, flex, or deflect upwardly. The upward deflection of elastically-flexible member 80 closes the axial gap between the uppermost extent of second projection 94 and lower end 82 of control valve seat 64. Additionally, the pressure differential at the upper and lower portions of elastically-flexible member 80 also causes upper plunger member 72 to remain in contact with the nose or lower portion of elastically-flexible member 80 during an injection event.

In this way, any fuel from injector cavity 50 that flows into inlet orifice 89 is prevented from flowing into flow passage 68 because second projection 94 is sealed against lower end 82 of control valve seat 64 and inhibits any further flow. As such, parasitic drain flow from injector cavity 50 to drain conduit 108 is prevented during a portion injection event when needle valve element 52 is not seated against nozzle housing 48. In this way, fuel flow from control volume 70 toward drain conduit 108 continues through orifices 101,

102 but fuel flow from injector cavity 50 toward drain conduit 108 ceases as control valve member 66 moves to an open condition. It may be appreciated that the sealing of second projection 94 against control valve seat 64 prevents the parasitic drain fuel flow and, should upward deflection of elastically-flexible member 80 continue to occur, third projection 98 defines the upper deflection limit of elastically-flexible member 80 when third projection 98 comes into contact with lower end 82 of control valve seat 64.

It may further be appreciated that needle valve element 52 has not yet moved at the initiation of the injection event. However, as the pressure in control volume 70 continues to decrease when fuel flows through flow passage 68, needle valve element 52 then moves upwardly and away from injector orifices 54 such that fuel can flow from fuel injector 30 into combustion chambers 32 (FIG. 1). Through the entire injection event, as needle valve element 52 translates upwardly, second projection 94 remains in its intended, sealing contact with control valve seat 64 to prevent parasitic drain fuel flow from injector cavity 50 to drain conduit 108. Additionally, during the portion of the injection event when needle valve element 52 then moves upwardly and away from injector orifices 54, upper plunger member 72 remains in contact with the nose or longitudinally lower portion of elastically-flexible member 80.

To initiate the termination of the injection event, injector control valve assembly 62, including actuator assembly 78, is de-energized or otherwise deactivated. Control valve member 66 then moves toward the closed position where control valve member 66 is seated against control valve seat 64. When control valve member 66 is seated on control valve seat 64 in the closed position, the fluid connection between control volume 70 and drain conduit 108 is closed because fluid cannot flow through flow passage 68. And, because needle valve element 52 is still translating upwardly at this time, pressure in control volume 70 begins to increase due to the compression of fuel therein from needle valve element 52. As such, the pressure above needle valve element 52 increases, thereby causing the upward translation of needle valve element 52 to slow. However, once needle valve element 52 begins to slow, this decreased rate of upward translation of needle valve element 52 causes the flow rate from control volume 70 through orifices 101, 102 to decrease which decreases the pressure differential across orifices 101, 102 thereby increasing the pressure radially inwardly of second projection 94. It may be appreciated that until the pressure begins to increase at a location radially inward of second projection 94 at the start of the termination event, second projection 94 has remained in an intended sealed contact with control valve seat 64, thereby preventing fuel flow from injector cavity 50 to drain conduit 108. More particularly, the pressure in recess 100 is less than the pressure at recess 106 which maintains elastically-flexible member 80 in an upward deflection such that second projection 94 is sealed against control valve seat 64.

However, as the pressure at recesses 100, 106 begins to equilibrate, there is less net force on elastically-flexible member 80 causing the upward deflection thereof. As the pressure differential continue to decrease, the net forces acting as a result of the pressure differentials across elastically-flexible member 80 decrease, as such, elastically-flexible member 80 begins to deflect downwardly toward its neutral position, thereby separating second projection 94 from the lower end 82 of control valve seat 64. The separation of second projection 94 enables fuel to flow through orifices 101, 102 into control volume 70. This increased fuel flow into control volume 70 re-pressurizes control volume 70, thereby causing needle valve element 52 to move downwardly toward distal end 56 of fuel injector 30. The pressure differential across orifice 101 creates a force which acts to enable upper plunger member 72 to separate from elastically-flexible member 80. The pressure drop across orifice 102 enables the elastically-flexible member 80 to deflect to open beyond its neutral position, thereby further separating second projection 94 from the lower end 82 of control valve seat 64.

This increased fuel flow in the downward direction during the termination event causes downward translation of needle valve element 52 to occur more rapidly than if upper plunger member 72 had not separated from elastically-flexible member 80. When needle valve element 52 is seated at distal end 56, injector orifices 54 are closed and fuel flow from fuel injector 30 into combustion chambers 32 is terminated. The flow rate through orifice 101 decreases which reduces the pressure differential across orifice 101 and the upper plunger member 72 closes to re-contact the elastically-flexible member 80.

It may be appreciated that an upper surface 104 of retainer 84 may define a lower stop surface or limit which prevents excessive downward deflection or bending of elastically-flexible member 80 when needle valve element 52 is moving downwardly toward distal end 56 of fuel injector 30. Additionally, upper surface 104 is generally longitudinally opposite third projection 98 such that the upper and lower limits of elastically-flexible member 80 occur at approximately the same radial position. The nose or lower portion of elastically-flexible member 80 is again brought into contact with upper plunger member 72 and the components of fuel injector 30 are appropriately positioned for a future injection event and then the elastically-flexible member 80 elastically returns to its neutral position.

Figure 3A:
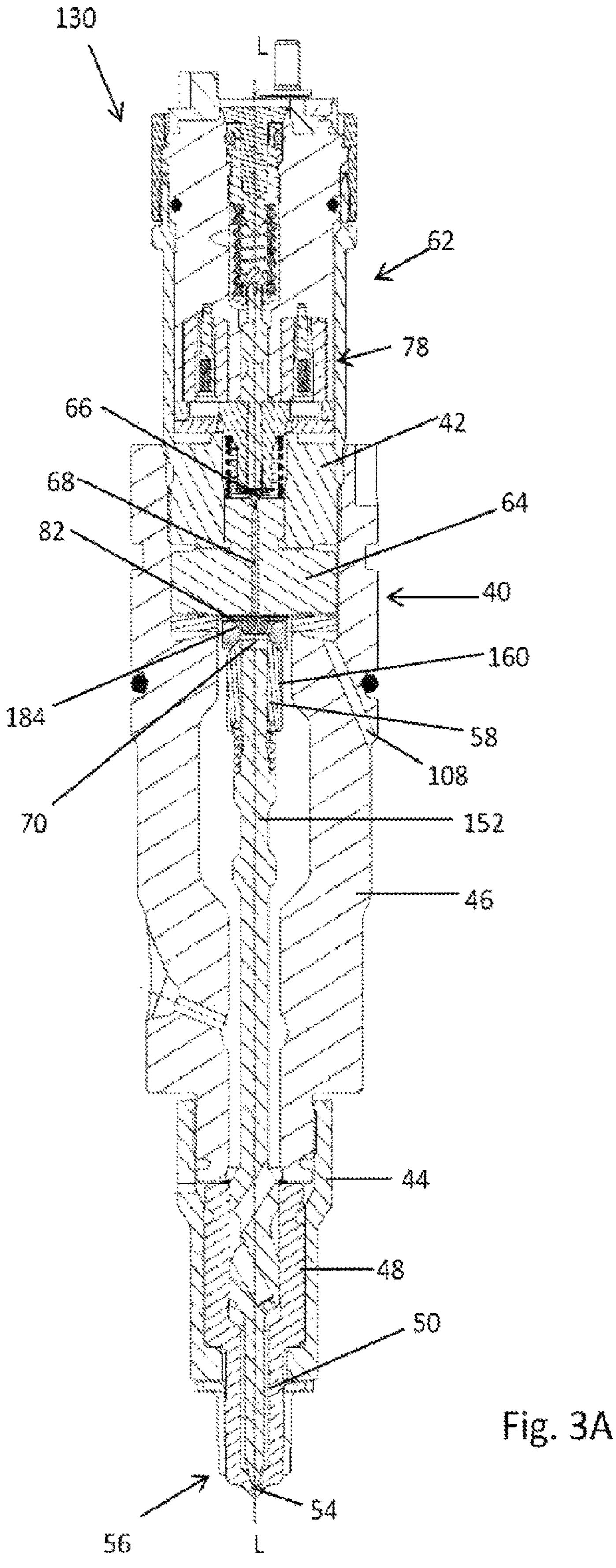
FIG. 3A is a cross-sectional view of a fuel injector of the engine of FIG. 1.
Figure 3B:
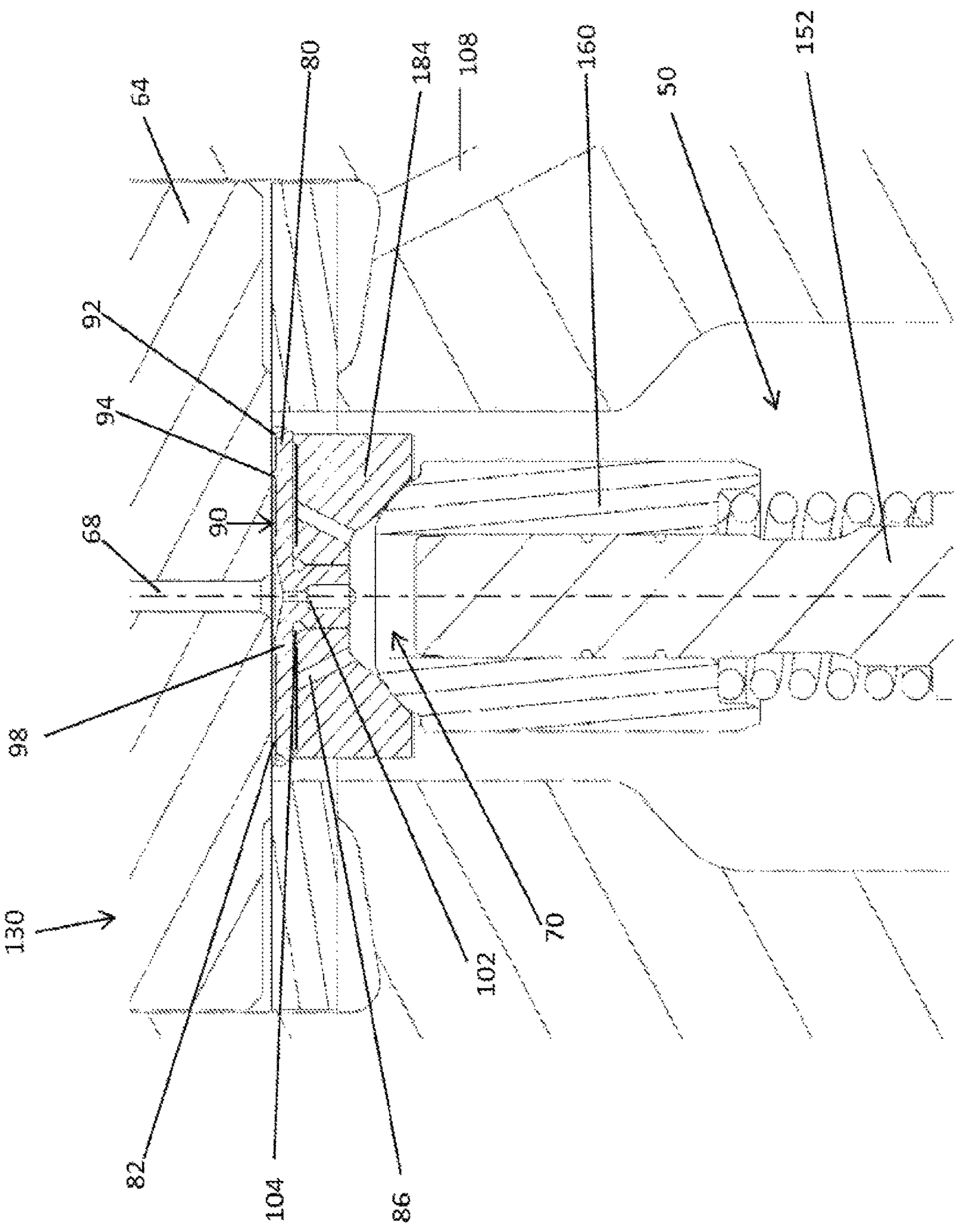
FIG. 3B is a detailed cross-sectional view of a second embodiment flexible member of the fuel injector of FIG. 3A.
Figure 3C:
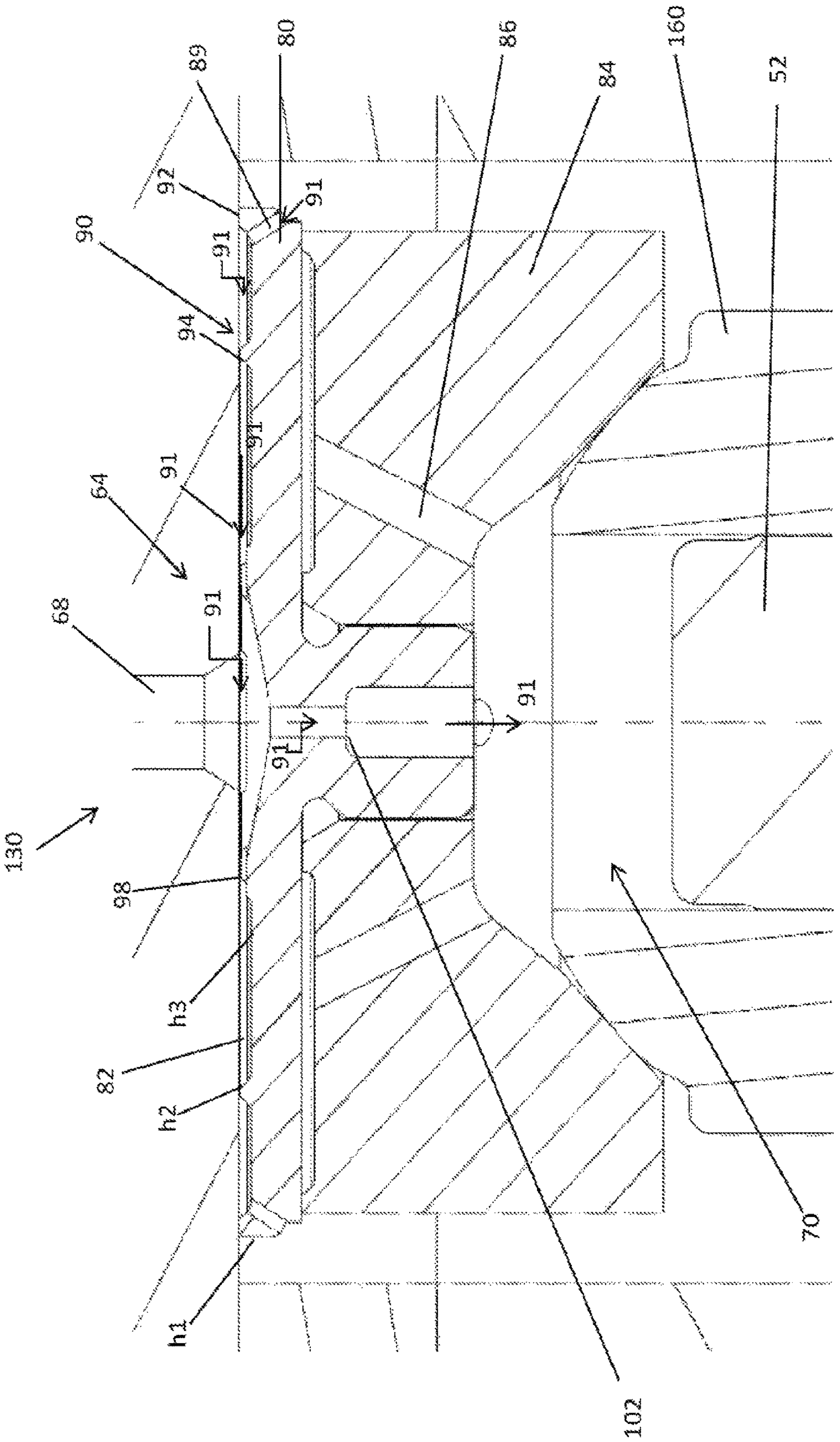
FIG. 3C is a further detailed cross-sectional view of the flexible member of FIG. 3B.

Referring now to FIGS. 3A-3C, a fuel injector 130 is shown with various components of fuel injector 30 FIG. 2A, with like reference numbers indicating like components between FIGS. 2A and 3A. Fuel injector 130 is defined by injector body 40 including upper body 42, lower body 44, and outer housing 46 coupling upper body 42 to lower body 44. Lower body 44 includes nozzle housing 48 which generally surrounds injector cavity 50. A nozzle or needle valve element 152, which extends generally along longitudinal axis L, is received within injector cavity 50 and is fluidly coupled to injector orifices 54 at distal end 56 of lower body 44. Nozzle valve element 152 also extends into nozzle element cavity 58 formed within a nozzle element guide or sleeve 160. During operation of fuel injector 130, nozzle valve element 152 is movable between an open condition in which fuel may flow through injector orifices 54 into combustion chamber 32 and a closed condition in which fuel flow through injector orifices 54 is blocked.

As shown in FIG. 3A, compared to the illustrative embodiment of FIG. 2A, fuel injector 130 does not include upper plunger member 72 (FIG. 2A) within control chamber 70. Instead, nozzle valve element 152 is configured to move along longitudinal axis L when opening and closing control valve member 66 relative to control valve seat 64. More particularly, movement of control valve member 66 and nozzle valve element 152 may be controlled by actuator assembly 78 of injector control valve assembly 62.

During operation of fuel injector 130, fuel from fuel rail 31 (FIG. 1) is supplied to fuel injector 130. However, during periods of injection, fuel from injector cavity 50 may flow into a drain conduit 108 through the pilot valve, for example through control valve seat 64, thereby leading to parasitic drain flow during an injection event. This parasitic drain flow can contribute to a loss of efficiency in fuel system 20 and/or engine 10 and decreased fuel economy. Therefore, as disclosed herein, fuel injector 130 is configured to prevent or inhibit this parasitic drain flow of fuel while still allowing the necessary flow of fuel between fuel injector 130 and fuel rail 31 during periods of injection and non-injection. By inhibiting parasitic drain flow, the efficiency of fuel system 20 may increase, the fuel economy may increase, the fuel injector failure mechanisms may decrease, and fueling sensitivity to small changes in pilot valve stroke may improve.

In operation, and as disclosed in FIGS. 3B and 3C, when a fuel injection event is initiated, injector control valve assembly 62 is energized or otherwise actuated, thereby energizing actuator assembly 78. Energizing injector control valve assembly 62 causes control valve member 66 to start to move to an open condition by lifting off of control valve seat 64. As control valve member 66 begins to move upwardly in the direction of longitudinal axis L, pressure within fuel injector 130 around elastically-flexible member 80 begins to change. More particularly, pressure at the upper surface of elastically-flexible member 80 decreases because fluid in the flow passage 68 flows through control valve member and the fluid in control volume 70 moves upwardly through orifice 102, through flow passage 68, and through slots (not shown) for drain fuel flow toward drain conduit 108. It may be appreciated that the effective flow areas of orifice 102 may control the rate of fuel flow therethrough such that the size of orifice 102 has some effect on the opening rate of injector control valve assembly 62.

This flow of fuel from control volume 70 and through orifice 102 and flow passage 68 decreases the pressure at the upper surface of elastically-flexible member 80 and increases the pressure differential between the pressures acting on the upper and the lower surface thereof. Additionally, fuel flow from injector cavity 50 through inlet orifice 89 of elastically-flexible member 80 creates a pressure differential drop between the pressure in injector cavity 50 and the pressure downstream of inlet orifice 89. As such, if elastically-flexible member 80 were to remain in a neutral position during an injection event, fuel from injector cavity 50 would flow into inlet orifice 89, past the open gap between second projection 94 and the lower end 82 of control valve seat 64, through flow passage 68, past control valve member 66 toward drain conduit 108. In this way, parasitic fuel flow to drain conduit 108 from injector cavity 50 would occur.

However, to inhibit this parasitic drain flow from injector cavity 50 to drain conduit 108 during an injection event, the present disclosure provides elastically-flexible member 80. More particularly, the pressure differential on elastically-flexible member 80 caused by the decreased pressure at the upper surface thereof and the relatively higher pressure at the lower surface thereof in response to the fuel flow towards drain conduit 108 causes elastically-flexible member 80 to elastically bend, flex, or deflect upwardly. The upward deflection of elastically-flexible member 80 closes the axial gap between the uppermost extent of second projection 94 and lower end 82 of control valve seat 64.

In this way, any fuel from injector cavity 50 that flows into inlet orifice 89 is prevented from flowing toward flow passage 68 because second projection 94 is sealed against lower end 82 of control valve seat 64. As such, parasitic drain flow from injector cavity 50 to drain conduit 108 is prevented during the portion of the injection event when needle valve element 52 is not seated against nozzle housing 48. In this way, fuel flow from control volume 70 toward drain conduit 108 continues through orifice 102 but fuel flow from injector cavity 50 toward drain conduit 108 ceases as control valve member 66 begins to move to an open condition. It may be appreciated that the sealing of second projection 94 against control valve seat 64 prevents the parasitic drain fuel flow, however, should upward deflection of elastically-flexible member 80 continue to occur, third projection 98 defines the upper deflection limit of elastically-flexible member 80 if third projection 98 comes into contact with lower end 82 of control valve seat 64.

It may further be appreciated that needle valve element 152 has not yet moved at the initiation of the injection event, however, as the pressure in control volume 70 decreases when fuel flows through flow passage 68, needle valve element 152 then moves upwardly and away from injector orifices 54 such that fuel can flow from fuel injector 30 into combustion chambers 32 (FIG. 1). Through the entire injection event, as needle valve element 152 translates upwardly, second projection 94 remains in its intended, sealing contact with control valve seat 64 to prevent parasitic drain fuel flow from injector cavity 50 to drain conduit 108. It may be appreciated that the effective flow areas of orifice 102 affects the opening translation rate of needle valve element 152.

To initiate the termination of the injection event, injector control valve assembly 62, including actuator assembly 78, is de-energized or otherwise deactivated. Control valve member 66 then moves toward the closed position where control valve member 66 is seated against control valve seat 64. When control valve member 66 is seated on control valve seat 64 in the closed position, the fluid connection between control volume 70 and drain conduit 108 is closed because fluid cannot flow through flow passage 68. And, because needle valve element 152 is still translating upwardly at this time, pressure in control volume 70 begins to increase due to the compression of fuel therein from needle valve element 152. As such, the pressure above needle valve element 152 increases, thereby causing the upward translation of needle valve element 152 to slow. The decreased upward translation of needle valve element 152 causes the flow rate from control volume 70 through orifice 102 to decrease which decreases the pressure differential across orifice 102 thereby increasing the pressure radially inwardly of second projection 94. It may be appreciated that until the pressure begins to increase at a location radially inward of second projection 94 at the start of the termination event, second projection 94 has remained in an intended sealed contact with control valve seat 64, thereby preventing fuel flow from injector cavity 50 to drain conduit 108. More particularly, the pressure in recess 100 is less than the pressure at recess 106 which maintains elastically-flexible member 80 in an upward deflection such that second projection 94 is sealed against control valve seat 64.

However, as the pressure at recesses 100, 106 begins to equilibrate, there is less net force on elastically-flexible member 80 causing the upward deflection thereof. As the pressure differential continue to decrease, the net forces acting as a result of the pressure differentials across elastically-flexible member 80 decrease, as such, elastically-flexible member 80 begins to deflect downwardly toward its neutral position, thereby separating second projection 94 from the lower end 82 of control valve seat 64. The separation of second projection 94 enables fuel to flow through orifice 102 into control volume 70. This increased fuel flow into control volume 70 re-pressurizes control volume 70, thereby causing needle valve element 152 to move downwardly toward distal end 56 of fuel injector 130. It may be appreciated that the effective flow area of orifice 102 affects the closing translation rate of needle valve element 152.

The pressure drop across orifice 102 enables the elastically-flexible member 80 to deflect to open beyond its neutral position, thereby further separating second projection 94 from the lower end 82 of control valve seat 64. When needle valve element 152 is seated at distal end 56, injector orifices 54 are closed and fuel flow from fuel injector 130 into combustion chambers 32 is terminated.

It may be appreciated that the embodiment of fuel injector 130 (FIGS. 3A-3C) relative to the embodiment of fuel injector 30 (FIGS. 2A-2D) does not include an additional translating member in the form of upper plunger member 72. Rather, the embodiment of fuel injector 130 is configured to allow elastically-flexible member 80 to bend, flex, deform, or otherwise deflects with movement of nozzle valve element 152 and control valve member 66. In this way, the embodiment of fuel injector 130 (FIGS. 3A-3C) eliminates a translating member which may increase cost or complexity (e.g., due to the need to calibrate stroke, accommodate narrow tolerance ranges, etc.) to the fuel injector. Also, because elastically-flexible member 80 of fuel injectors 30 and 130 includes central orifice 102, the configurations of fuel injectors 30, 130 allow for rate control when opening and closing needle valve element 152.

Figure 4A:
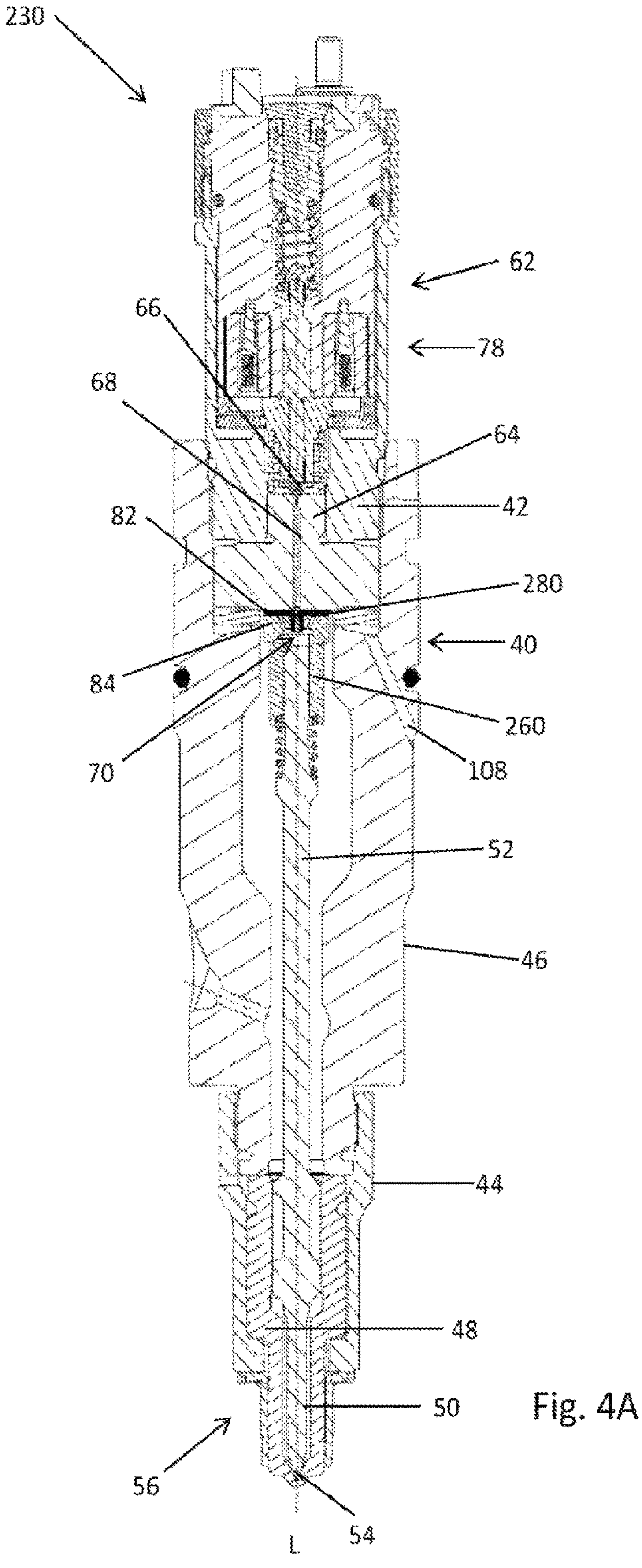
FIG. 4A is a cross-sectional view of a fuel injector of the engine of FIG. 1.

Referring now to FIGS. 4A-4E, a fuel injector 230 is shown with various components of fuel injector 30 of FIG. 2A and fuel injector 130 of FIG. 3A, with like reference numbers indicating like components between FIGS. 2A, 3A, and 4A. Fuel injector 230 is defined by injector body 40 including upper body 42, lower body 44, and outer housing 46 coupling upper body 42 to lower body 44. Lower body 44 includes nozzle housing 48 which generally surrounds injector cavity 50. Nozzle or needle valve element 52, which extends generally along longitudinal axis L, is received within injector cavity 50 and is fluidly coupled to injector orifices 54 at distal end 56 of lower body 44. Nozzle valve element 52 also extends into nozzle element cavity 58 formed within a nozzle element guide or sleeve 260. As shown in FIG. 4A, compared to the illustrative embodiment of FIG. 2A, fuel injector 230 does not include upper plunger member 72 (FIG. 2A) within control chamber 70. During operation of fuel injector 230, nozzle valve element 52 is movable between the open position in which fuel may flow through injector orifices 54 into combustion chamber 32 and the closed positon in which fuel flow through injector orifices 54 is blocked.

During operation of fuel injector 230, fuel from fuel rail 31 (FIG. 1) is supplied to fuel injector 230. However, during an injection event, fuel may flow from injector cavity 50 to drain conduit 108, thereby leading to a parasitic drain flow of fuel from fuel system 20. This parasitic drain flow can contribute to a loss of efficiency in fuel system 20 and/or engine 10 and decreased fuel economy. Therefore, fuel injector 230 is configured to prevent or inhibit this parasitic drain flow of fuel when fuel injector 230 during a fuel injection event or cycle. By inhibiting parasitic drain flow, the efficiency of fuel system 20 may increase, the fuel economy may increase, the fuel injector failure mechanisms may decrease, and fueling sensitivity to small changes in pilot valve stroke may improve.

To decrease the quantity of parasitic drain fuel flow, fuel injector 230 includes an elastically-flexible member 280 positioned within a portion of injector body 40, as disclosed in FIGS. 4A-4E. Flexible member 280 includes a plurality of annular projections 290 in a radially-concentric arrangement such that each of the plurality of projections 290 is concentric about longitudinal axis L. Illustratively, the plurality of projections 290 includes a first or radially-outer projection 292 positioned at or near the circumference or periphery of flexible member 280 and defining the outer diameter or circumference of flexible member 280. Additionally, the plurality of projections 290 includes a second projection 294 positioned radially inward of first projection 292. First and second projections 292, 294 are spaced apart by a recess 296. The plurality of projections 290 also may include a third projection 298 positioned radially inward of second projection 294. Second and third projections 294, 298 are spaced apart from each other by a recess 300. The plurality of projections 290 further includes a fourth projection 302 positioned circumferentially inward of first, second, and third projections 292, 294, 298. Illustratively, fourth projection 302 is spaced apart from third projection 298 by a recess 304. Recesses 296, 300, 304 may facilitate elastic deformation of elastically-flexible member 280 during operation of fuel injector 230.

Figure 4B:
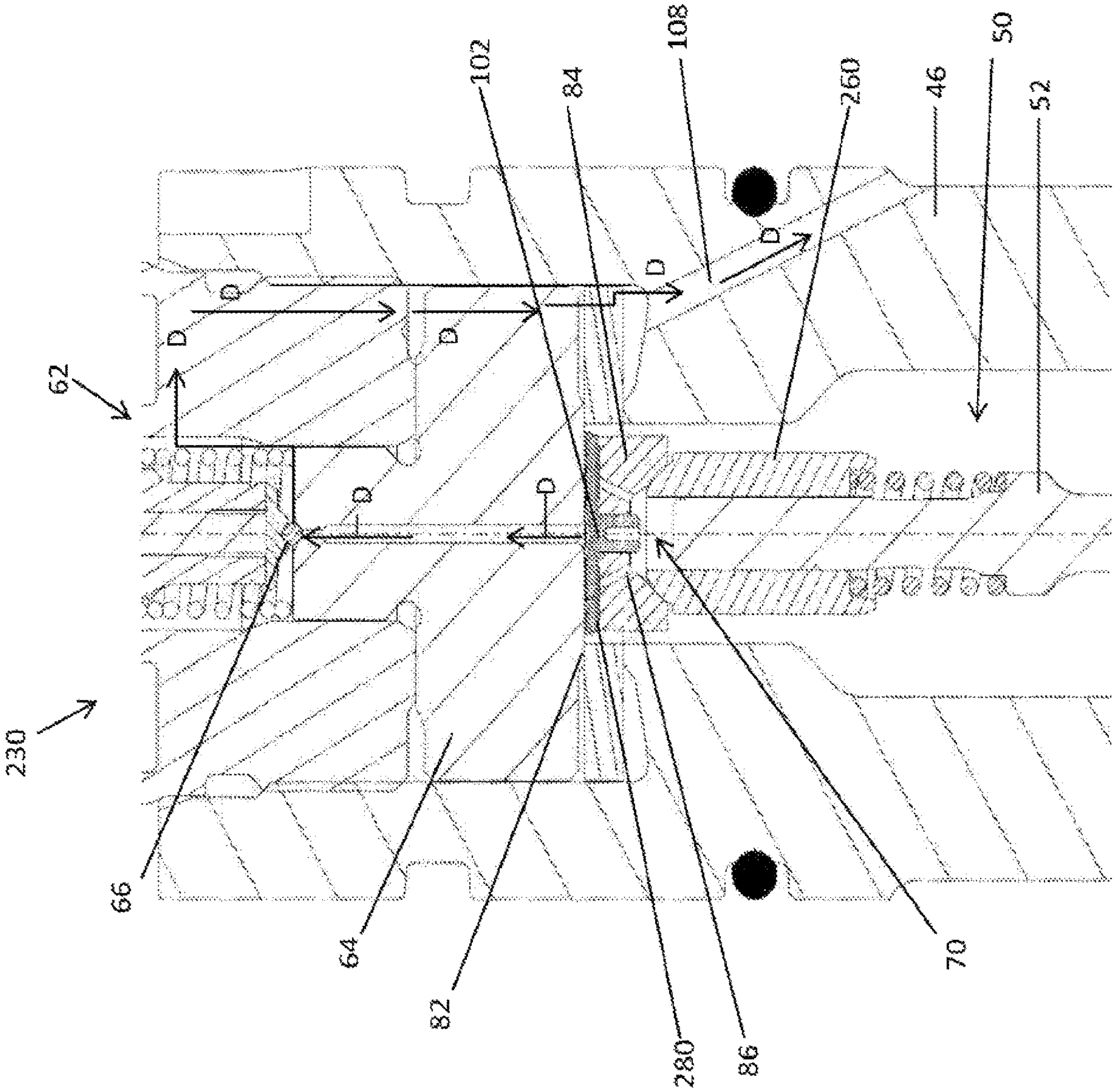
FIG. 4B is a detailed cross-sectional view of a third embodiment flexible member of the fuel injector of FIG. 4A.
Figure 4C:
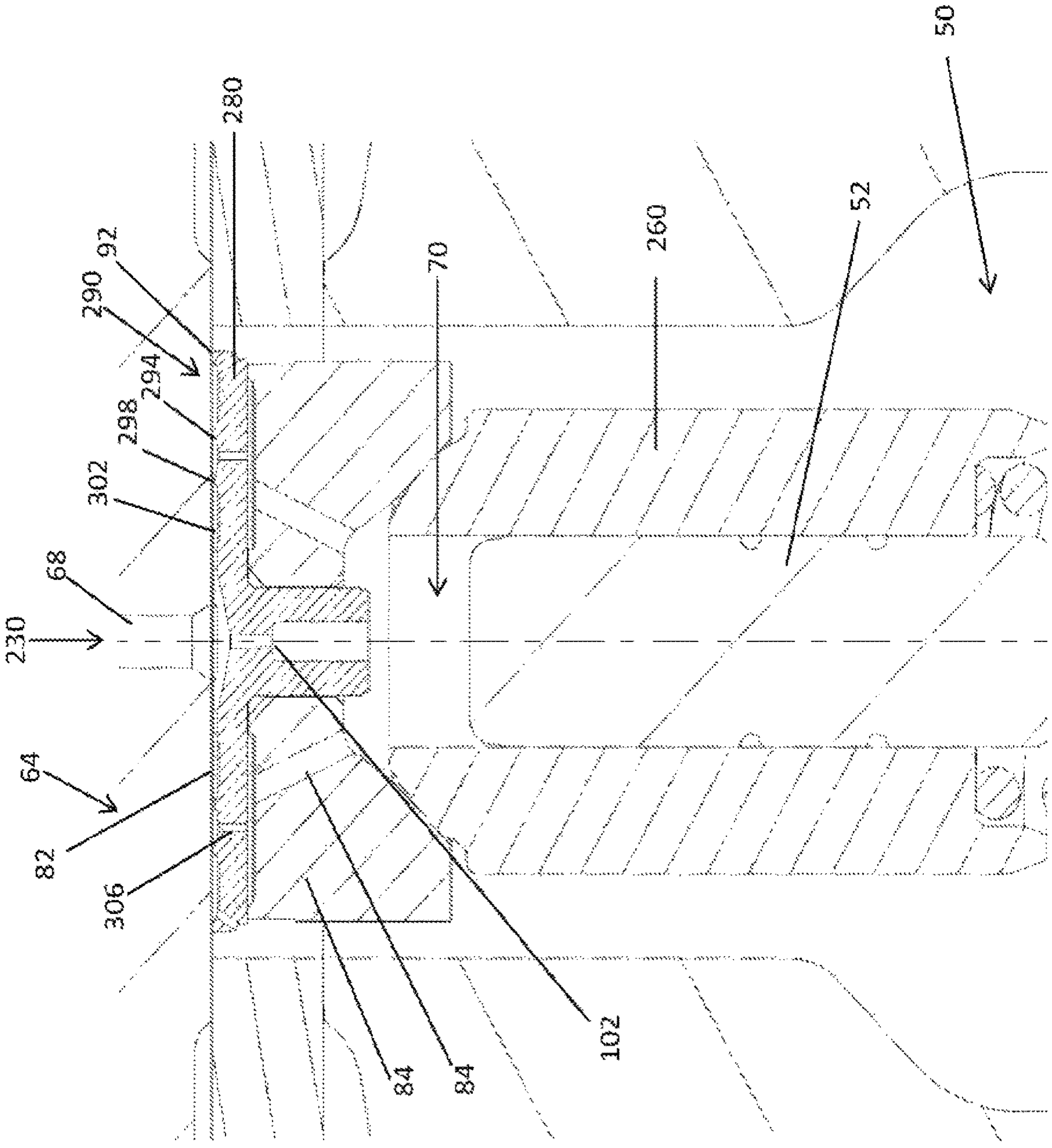
FIG. 4C is a further detailed cross-sectional view of the flexible member of FIG. 4B.
Figure 4D:
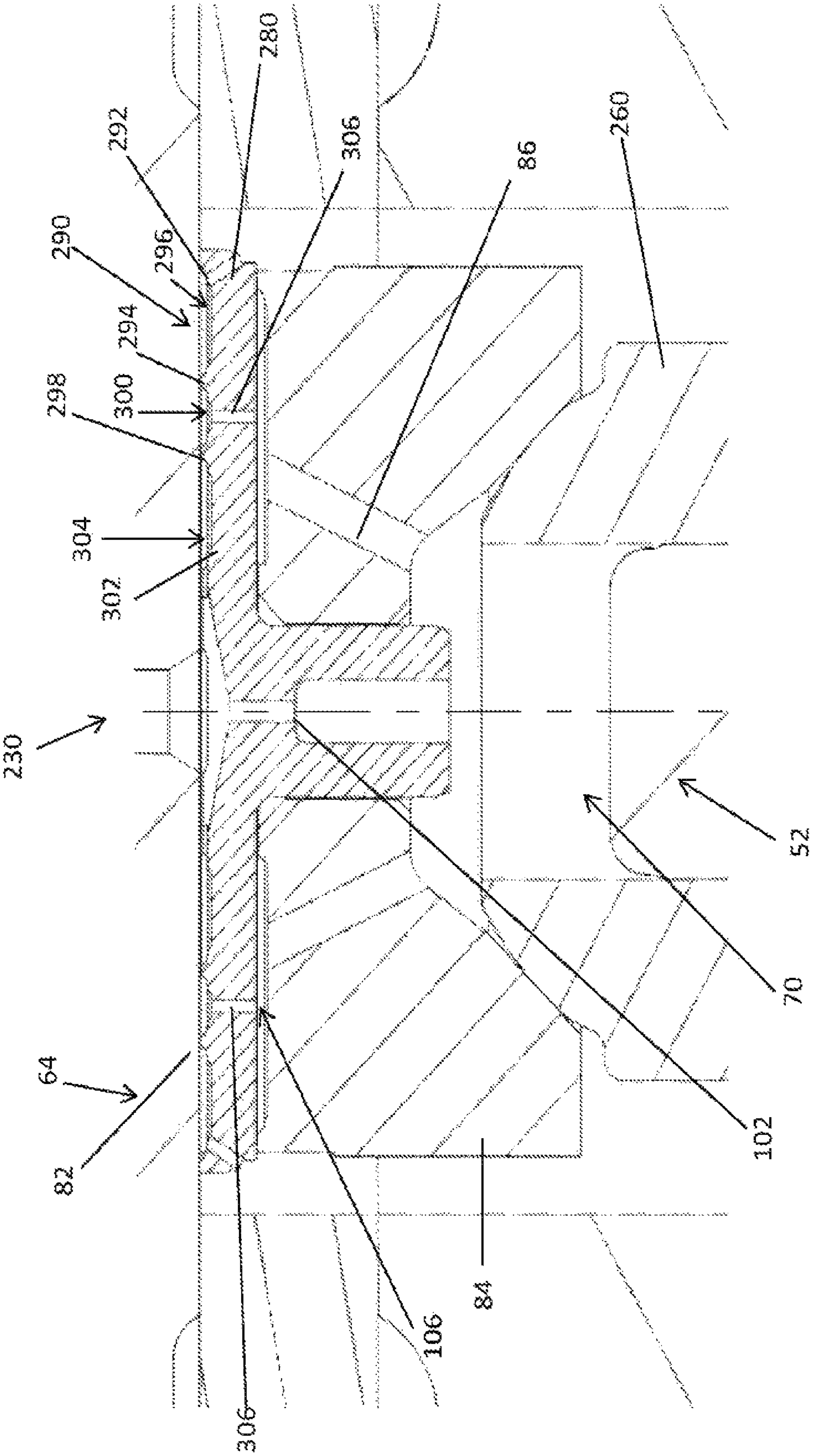
FIG. 4D is another cross-sectional view of the flexible member of FIG. 4C.
Figure 4E:
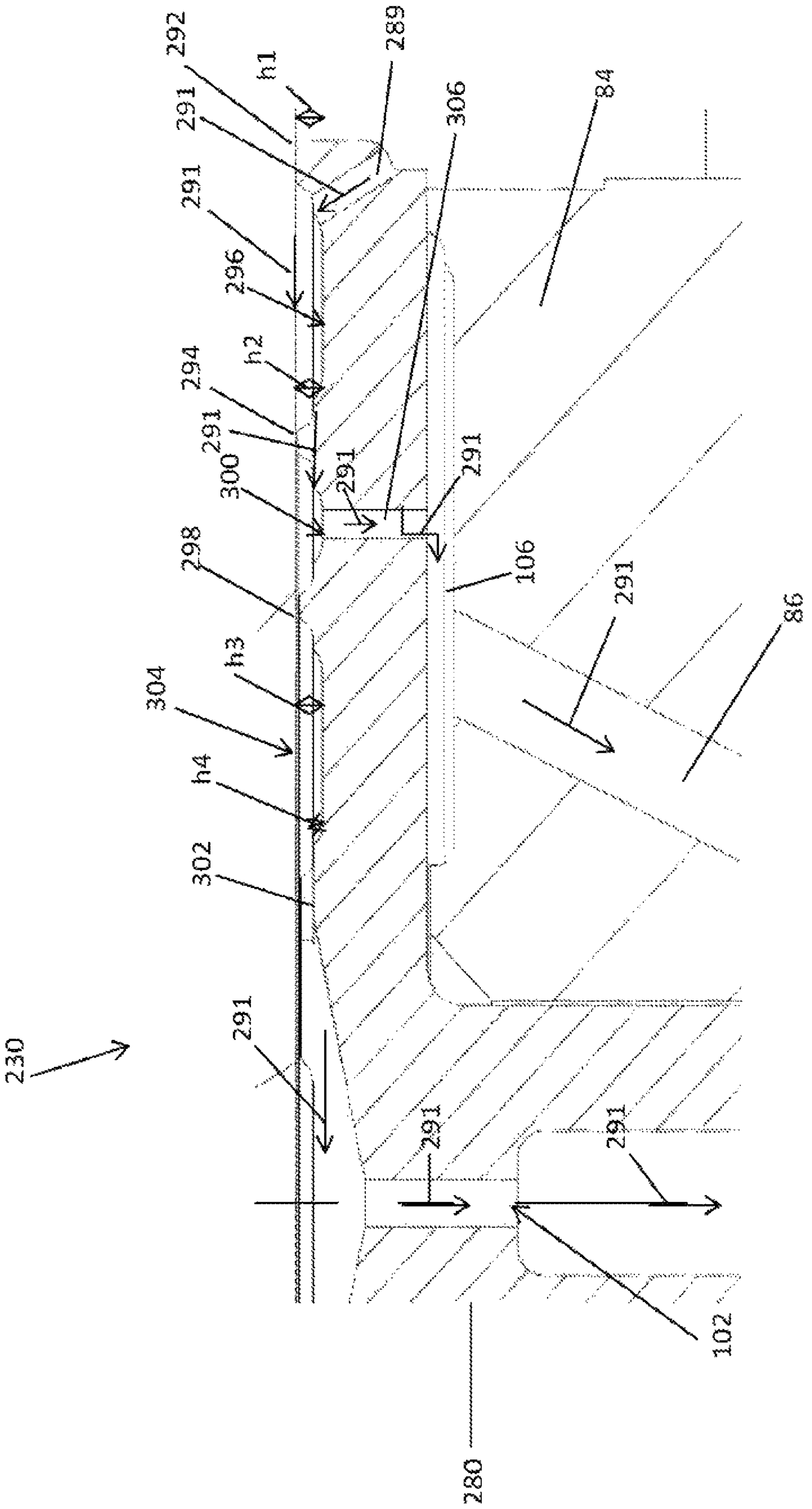
FIG. 4E is a cross-sectional view of a portion of the flexible member of FIG. 4D, illustrating a rate control fluid passageway.

In one embodiment, and referring still to FIGS. 4C-4E, the height of projections 290 may be different. For example, first projection 292 may have a first longitudinal height ($h_1$) defining the greatest longitudinal height relative to second, third, and fourth projections 294, 298, 302. Additionally, second projection 294 may have a second longitudinal height ($h_2$) less than that of first projection 292 but greater than a third longitudinal height ($h_3$) of third. Also, fourth projection 302 has a fourth longitudinal height ($h_4$) which may be less than that of first, second, and third projections 292, 294, 298. In one embodiment, heights ($h_1$, $h_2$, $h_3$, $h_4$) of projections 290 decrease in a radially-inward direction toward longitudinal axis L and may be positioned along a diagonal line angled at approximately 0.1-1.0 degrees, and more particularly 0.6 degrees, from horizontal. Alternatively, heights ($h_1$, $h_2$, $h_3$, $h_4$) of projections 290 can be in any configuration and at any height.

The declining heights of projections 290 in the radially inward direction provides for increasingly larger axial gaps or distances in the direction of longitudinal axis L between the uppermost extent of each projection 290 and lower end 82 of control valve seat 64. More particularly, first projection 292 always remains in contact with lower end 82 of control valve seat 64 such that the outer diameter or perimeter of elastically-flexible member 280 is always seated with an intended sealing function against control valve seat 64. However, the uppermost extent of second and third projections 294, 298 is spaced apart from lower end 82 by an axial gap or distance when elastically-flexible member 280 is in a neutral (i.e., non-flexed) position. Similarly, an axial gap or distance between the uppermost extent of fourth projection 302 and lower end 82 exists when elastically-flexible member 280 is in the neutral position and may be greater than that of second and third projections 294, 298. In one embodiment, fourth projection 302 defines an upper deflection limit for elastically-flexible member 280 such that further upward deflection thereof is prevented when fourth projection 302 contacts lower end 82 of control valve seat 64.

In this way, and as disclosed further herein, when elastically-flexible member 280 flexes in an upward direction, second and third projections 294, 298 are configured to contact lower end 82 of control valve seat 64 to seal elastically-flexible member 280 thereto. As such, when elastically-flexible member 280 elastically deforms in an upward direction, fuel at elastically-flexible member 280 may be prevented from flowing towards drain conduit 108. Yet when elastically-flexible member 280 is in a neutral position or elastically deforms in a downward direction, second and third projections 294, 298 are spaced apart from control valve seat 64 such that fuel may flow through a portion of elastically-flexible member 280. Because fourth projection 302 is intended to function as a stop but not as a seal, the configuration of elastically-flexible member 280 includes flow passages which radially span fourth projection 302.

In operation, and as disclosed in FIGS. 4B-4E, when a fuel injection event is initiated, injector control valve assembly 62 is energized or otherwise actuated, thereby energizing actuator assembly 78. Energizing injector control valve assembly 62 causes control valve member 66 to start to move to an open condition by lifting off of control valve seat 64. As control valve member 66 begins to move upwardly in the direction of longitudinal axis L, pressure within fuel injector 230 around elastically-flexible member 280 begins to change. More particularly, and as shown in FIG. 4B, pressure at the upper surface of elastically-flexible member 280 decreases because fluid from flow passage 68 flows through control valve member 66 and fluid in control volume 70 moves upwardly through orifice 102, in the direction of arrows D through flow passage 68, and through slots (not shown) for drain fuel flow. Referring still to FIG. 4B, fuel flows in direction D from flow passage 68 upwardly and laterally outwardly before flowing downwardly and into drain conduit 108. It may be appreciated that the diameter or effective flow area of central orifice 102 controls the rate of fuel flow therethrough such that the size of orifice 102 has some effect on the opening rate of injector control valve assembly 62.

This flow of fuel from control volume 70, through orifice 102, and through flow passage 68 decreases the pressure at the upper surface of elastically-flexible member 280 and creates a pressure differential between the pressures which act on the upper surfaces of elastically-flexible member 280 relative to the pressures which act on the lower surfaces of elastically-flexible member 280. Additionally, fuel flow from injector cavity 50 through inlet orifice 89 of elastically-flexible member 280 creates a pressure differential drop between the pressure in injector cavity 50 and the pressure downstream of inlet orifice 289. As such, if elastically-flexible member 280 were to remain in a neutral position during an injection event, fuel from injector cavity 50 would flow into inlet orifice 289, past the open gap between second projection 294 and the lower end 82 of control valve seat 64, through flow passage 68, past control valve member 66 toward drain conduit 108, through the axial gap between the uppermost extents of second and third projections 294 and 298, into flow passage 68, and in direction D to drain conduit 108. In this way, parasitic fuel flow to drain conduit 108 would occur due to this flow between injector cavity 50 and drain conduit 108.

However, to inhibit this parasitic drain flow from injector cavity 50 to drain conduit 108 during an injection event, the present disclosure provides elastically-flexible member 280. More particularly, the pressure differential on elastically-flexible member 280 caused by the decreased pressure at the upper surface thereof and the relatively higher pressure at the lower surface thereof in response to the fuel flow towards drain conduit 108 causes elastically-flexible member 280 to elastically bend, flex, or deflect upwardly. The upward deflection of elastically-flexible member 280 closes the axial gap between the uppermost extent of second projection 294 and third projection 298 and lower end 82 of control valve seat 64.

In this way, any fuel from injector cavity 50 that flows into inlet orifice 289 is prevented from flowing toward flow passage 68 because second projection 294 and/or third projection 298 is sealed against lower end 82 of control valve seat 64. As such, parasitic drain flow from injector cavity 50 to drain conduit 108 is prevented during the portion of the injection event when needle valve element 52 is not seated against nozzle housing 48. It may be appreciated that the sealing of second projection 294 and/or third projection 298 against control valve seat 64 prevents the parasitic drain fuel flow, however, should upward deflection of elastically-flexible member 280 continue to occur, fourth projection 302 defines the upper deflection limit of elastically-flexible member 280 if fourth projection 302 comes into contact with lower end 82 of control valve seat 64. In this way, fuel flow from control volume 70 toward drain conduit 108 continues through orifice 102 but fuel flow from injector cavity 50 toward drain conduit 108 ceases as control valve member 66 begins to move to an open condition.

It may be appreciated that needle valve element 52 has not yet moved at the initiation of the injection event. However, as the pressure in control volume 70 continues to decrease when fuel flows through flow passage 68, needle valve element 52 then moves upwardly and away from injector orifices 54 such that fuel can flow from fuel injector 230 into combustion chambers 32 (FIG. 1). Through the entire injection event, as needle valve element 52 translates upwardly, second projection 294 and/or third projection 298 remains in its intended, sealing contact with control valve seat 64 to prevent parasitic drain fuel flow from injector cavity 50 to drain conduit 108.

To initiate the termination of the injection event, injector control valve assembly 62, including actuator assembly 78, is de-energized or otherwise deactivated. Control valve member 66 then moves toward the closed position when control valve member 66 is seated against control valve seat 64. When control valve member 66 is seated on control valve seat 64 in the closed position, the fluid connection between control volume 70 and drain conduit 108 is closed because fluid cannot flow through flow passage 68. And, because needle valve element 52 is still translating upwardly at this time, pressure in control volume 70 begins to increase due to the compression of fuel therein from needle valve element 52. As such, the pressure above needle valve element 52 increases, thereby causing the upward translation of needle valve element 52 to slow. The decreased upward translation of needle valve element 52 causes the flow rate from control volume 70 through orifice 102 to decrease which increases the pressure at a position radially inwardly of second projection 294 and/or third projection 298. It may be appreciated that until this increase in pressure at a position radially inward of second projection 294 and/or third projection 298 occurs at the start of the termination event, second projection 294 and/or third projection 298 has remained in sealed contact with control valve seat 64, thereby preventing fuel flow from injector cavity 50 to drain conduit 108. More particularly, the pressure in at least one of recesses 296, 300, 304 is less than the pressure at recess 106 which maintains elastically-flexible member 280 in an upward deflection such that second projection 294 and/or third projection 298 is sealed against control valve seat 64.

However, as the pressure at recesses 300 and/or 304 begins to equilibrate with that of recess 106, there is less net force on elastically-flexible member 280 causing the upward deflection thereof. As the pressure differential continue to decrease, the net forces acting as a result of the pressure differentials across elastically-flexible member 280 decrease, as such, elastically-flexible member 280 begins to deflect downwardly toward its neutral position, thereby separating second projection 294 and third projection 298 from the lower end 82 of control valve seat 64. The separations of second projection 294 and third projection 298 enables fuel to flow through orifices 102 and 306 into control volume 70. This increased fuel flow into control volume 70 re-pressurizes control volume 70, thereby causing needle valve element 52 to move downwardly toward distal end 56 of fuel injector 230. The pressure drop across orifices 102 and 306 enables the elastically-flexible member 280 to deflect to open beyond its neutral position, thereby further separating second projection 294 and third projection 298 from the lower end 82 of control valve seat 64.

When needle valve element 52 is seated at distal end 56, injector orifices 54 are closed and fuel flow from fuel injector 30 into combustion chambers 32 is terminated.

As shown in FIGS. 4C-4E, elastically-flexible member 280 includes fluid passages 306. As fuel flows through inlet orifices 289 and along flow path 291, in addition to flowing toward central orifice 102, the fuel flows downwardly through fluid passages 306, enters recessed portions 106 of retainer 84, and flows into fluid passages 86 of retainer 84 when flowing towards control volume 70. In this way, the configuration of fuel injector 230 allows for rate control when opening needle valve element 52 by controlling flow through central orifice 102 of flexible member 280 and for rate control when closing needle valve element 52 by controlling flow through fluid passages 306 of flexible member 280.

It may be appreciated that fluid passages 306 are non-functional when needle valve element 52 translates upwardly because second and third projections 294, 298 are closed and, as such, there is no flow through fluid passages 306 at that time of the injection event. When needle valve element 52 begins to translate downwardly during termination of the injection event and the axial gap between projections 294, 298 and lower end 82 of control valve seat 64 is open for fuel flow through fluid passage 306. The pressure drop across orifices 102 and 306 enables the elastically-flexible member 280 to deflect to open beyond its neutral position, thereby further separating second projection 294 and third projection 298 from the lower end 82 of control valve seat 64.

The opening and closing rates may be the same or different from each other. More particularly, because the effective flow area of central orifice 102 controls the opening rate of needle valve element 52 while the effective flow area of fluid passages 306 controls the closing rate of needle valve element 52, the opening and closing rates may be independently controlled. In one embodiment, the rates may be identical to allow for the same opening and closing rates, however, in other embodiments, the opening and closing rates may be different to allow for faster opening rather than closing or vice versa. It may be appreciated that the opening and closing translation rates of needle valve element 52 affects the rate at which fuel flows from fuel injector 230 through injector orifices 54 into combustion chambers 32 (FIG. 1).

It may be appreciated that the embodiment of fuel injector 230 (FIGS. 4A-4E) relative to the embodiment of fuel injector 30 (FIGS. 2A-2D) does not include an additional translating member in the form of upper plunger member 72. Rather, the embodiment of fuel injector 230 is configured to allow flexible member 280 to bend, flex, deform, or otherwise deflect with movement of nozzle valve element 52 and control valve member 66. In this way, the embodiment of fuel injector 230 (FIGS. 4A-4E) eliminates a translating member which may increase cost or complexity to fuel injector 230. Further, because of central orifice 102 and fluid passages 306, the embodiment of elastically-flexible 280 allows for the fewest number of translating or moving components and also allows for rate control when opening and closing needle valve element 52.

The embodiments of fuel injectors 30, 130, 230 with flexible members 80, 280, and/or any combination thereof, may increase the fuel efficiency of engine 10. This improved efficiency may have the positive effect of increasing fuel economy; reducing fuel injector failure mechanisms (e.g., seat spalling); reducing the required fuel pump capacity; reducing noise during fueling; controlling fueling errors, especially at low injection quantities; reducing body and rail pressure dynamics, and reducing thermal damage and/or wear to the drain conduit and the fuel filter.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A fuel injector, comprising:

an injector body comprising an internal injector cavity, a control volume, a drain conduit, and a flow passageway in fluid communication with the control volume and at least one injector orifice;

a valve assembly comprising a control valve seat and a valve member in fluid communication with the flow passageway, the valve member being configured to move between an open position allowing fuel flow through the at least one injector orifice and a closed position inhibiting fuel flow through the at least one injector orifice;

a nozzle valve element fluidly coupled to the valve assembly; and a flexible member configured to elastically deform in response to pressure in the fuel injector, the flexible member being configured to simultaneously prevent flow from the injector cavity to the drain conduit during an injection event and permit flow from the control volume to the drain conduit.

2. The fuel injector of claim 1, wherein the flexible member is located at a position relative to the nozzle valve element and is configured to remain at the position independent of movement of the nozzle valve element.

3. The fuel injector of claim 1, wherein the flexible member includes a first flow passage configured to control a rate of closing the nozzle valve element and a second flow passage configured to control a rate of opening the nozzle valve element.

4. The fuel injector of claim 1, further comprising an upper plunger member and a biasing element, the biasing element being positioned longitudinally between the upper plunger member and the nozzle valve element, wherein the upper plunger member and the nozzle valve element are configured to move relative to the flexible member and at least a portion of the upper plunger member is positioned within the biasing element.

5. The fuel injector of claim 1, wherein the flexible member is comprised of steel.

6. The fuel injector of claim 1, wherein the flexible member is configured to elastically deform within an elastic yield range of steel.

7. The fuel injector of claim 1, wherein the flexible member includes a plurality of projections configured to abut a lower end of the control valve seat during the injection event to prevent flow from the injector cavity to the drain conduit.

8. The fuel injector of claim 7, wherein the plurality of projections includes at least a first annular projection and a second annular projection positioned radially inward of the first annular projection, and a height of the second annular projection is less than that of the first annular projection.

9. The fuel injector of claim 8, further comprising a stop surface positioned radially inward of the first and second annular projections, and the stop surface is configured to inhibit elastic deformation of the flexible member when the stop surface abuts the lower end of the control valve seat.

10. The fuel injector of claim 7, wherein the plurality of projections are configured to abut the lower end of the control valve seat during the injection event to prevent flow through a first passage through the plurality of projections.

11. The fuel injector of claim 10, wherein the plurality of projections are further configured to abut the lower end of the control valve seat during the injection event to permit flow through a second passage from the control volume to the drain conduit.

12. A fuel injector, comprising:

a fuel circuit including a control volume, a drain conduit, and a flow passageway in fluid communication with the control volume and at least one injector orifice;

a valve assembly in fluid communication with the fuel circuit and including a control valve seat and a control valve member configured to be received within the control valve seat, and the control valve member is configured to move between an open position allowing fuel flow through the at least one injector orifice and a closed position inhibiting fuel flow through the at least one injector orifice;

a nozzle valve element fluidly coupled to the valve member; and a flexible member positioned at a fixed location and configured to elastically deform in response to pressure in the fuel injector, the flexible member being configured to simultaneously prevent flow from the injector cavity to the drain conduit and permit flow from the control volume to the drain conduit during an injection event.

13. The fuel injector of claim 12, wherein the flexible member is positioned longitudinally intermediate the control valve seat and a retainer.

14. The fuel injector of claim 12, further comprising an upper plunger member configured to translate along a longitudinal axis based on the control valve member moving between the open and closed positions.

15. The fuel injector of claim 14, wherein the upper plunger member and the nozzle valve element are configured to translate relative to the flexible member.

16. The fuel injector of claim 12, wherein the flexible member is configured to elastically deform within an elastic yield range of a material comprising the flexible member.

17. The fuel injector of claim 12, wherein the flexible member includes a first fluid passage and the first fluid passage controls a first rate at which the nozzle valve element closes and a second fluid passage spaced apart from the first fluid passage and configured to control a second rate at which the nozzle valve element opens, and the first rate is different from the second rate.

18. The fuel injector of claim 12, wherein the flexible member includes a plurality of projections configured to abut a lower end of the control valve seat to prevent flow from the injector cavity to the drain conduit.

19. The fuel injector of claim 18, wherein the plurality of projections are configured to abut the lower end of the control valve seat to prevent flow through a first passage through the plurality of projections.

20. The fuel injector of claim 19, wherein the plurality of projections are further configured to abut the lower end of the control valve seat to permit flow through a second passage from the control volume to the drain conduit.

21. A fuel injector, comprising:

an injector body comprising an internal injector cavity, a drain conduit, and a flow passageway in fluid communication with a control volume and at least one injector orifice;

a valve assembly comprising a control valve seat and a valve member in fluid communication with the flow passageway, the valve member being configured to move between an open position allowing fuel flow through the at least one injector orifice and a closed position inhibiting fuel flow through the at least one injector orifice;

a nozzle valve element fluidly coupled to the valve assembly; and a flexible member comprising a monolithic structure configured to remain seated against a lower end of the control valve seat and to elastically deform in response to pressure in the fuel injector during an injection event to simultaneously inhibit flow from the injector cavity to the drain conduit and permit flow from the control volume to the drain conduit, wherein with the flexible member seated against a lower end of the control valve seat, a plurality of recesses are defined in the monolithic structure intermediate the flexible member and the lower end of the control valve seat, the plurality of recesses facilitating elastic deformation of elastically-flexible member.

22. The fuel injector of claim 21, wherein the flexible member includes a plurality of projections configured to abut the lower end of the control valve seat to inhibit flow through a first passage through the plurality of projections from the injector cavity to the drain conduit.

23. The fuel injector of claim 22, wherein the plurality of projections are further configured to abut the lower end of the control valve seat to permit flow through a second passage from the control volume to the drain conduit.

24. A method of controlling fuel flow through a fuel injector during an injection event, comprising:

providing a fuel circuit having an injector cavity, a drain conduit and a flow passageway in fluid communication with a control volume;

moving a control valve member from a control valve seat to define an open position and allow fuel flow through the flow passageway;

moving a nozzle valve element between an open position and a closed position in response to fuel flow through the fuel circuit;

elastically deforming a flexible member comprising an elastically deformable monolithic structure in a first direction during fuel flow through the flow passageway and from the fuel injector; and simultaneously inhibiting fuel flow from the injector cavity to the drain conduit when elastically deforming the flexible member in the first direction and permitting fuel flow from the control volume to the drain conduit, wherein the elastically deforming the flexible member is facilitated by plurality of recesses being defined in the elastically deformable monolithic structure intermediate the flexible member and the lower end of the control valve to facilitate elastic deformation of flexible member.

25. The method of claim 24, further comprising elastically deforming the flexible member in a second direction; and flowing fuel to the drain circuit when elastically deforming the flexible member in the second direction.

26. The method of claim 25, further comprising maintaining a position of the flexible member relative to the control valve member when inhibiting fuel flow to the drain circuit and flowing fuel to the drain circuit.

27. The method of claim 25, further comprising moving into contact with the control valve seat a plurality of longitudinally-extending projections of the flexible member when deforming the flexible member in the first direction.

28. The method of claim 27, further comprising moving, from the control valve seat, at least one of the plurality of longitudinally-extending projections when deforming the flexible member in the second direction.

29. The method of claim 24, further comprising providing, within the flexible member, a first fluid passage and a second fluid passage spaced apart from the first fluid passage.

30. The method of claim 29, further comprising controlling, independently, opening and closing of the nozzle valve element in response to fuel flow through the first and second fluid passages.

* * * * *